United States Patent
Hazel

(10) Patent No.: US 10,430,996 B2
(45) Date of Patent: Oct. 1, 2019

(54) GRAPHICS PROCESSING SYSTEMS

(71) Applicant: Geomerics Ltd, Cambridge (GB)

(72) Inventor: Graham Paul Hazel, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/804,755

(22) Filed: Nov. 6, 2017

(65) Prior Publication Data
US 2018/0130253 A1   May 10, 2018

(30) Foreign Application Priority Data
Nov. 9, 2016   (GB) .................................... 1618897.1

(51) Int. Cl.
*G06T 15/60* (2006.01)
*G06T 11/40* (2006.01)
*G06T 17/10* (2006.01)
*G06T 15/00* (2011.01)

(52) U.S. Cl.
CPC .............. *G06T 15/60* (2013.01); *G06T 11/40* (2013.01); *G06T 15/005* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 3,889,107 A | 6/1975 | Sutherland | |
| 6,535,209 B1 | 3/2003 | Abdalla | |
| 6,760,024 B1 | 7/2004 | Lokovic | |
| 7,868,901 B1 | 1/2011 | Edmondson | |
| 7,872,649 B1 | 1/2011 | Arvo | |
| 8,026,915 B1 | 9/2011 | Laur | |
| 8,217,949 B1 | 7/2012 | Carpenter | |
| 8,704,826 B1 | 4/2014 | Hakura | |
| 9,741,159 B2 | 8/2017 | Hazel | |
| 2004/0125103 A1 | 7/2004 | Kaufman et al. | |

(Continued)

FOREIGN PATENT DOCUMENTS

GB   2525636   11/2015

OTHER PUBLICATIONS

Office Action dated Oct. 11, 2018, in U.S. Appl. No. 15/625,597, filed Jun. 16, 2017.

(Continued)

*Primary Examiner* — Yingchun He
(74) *Attorney, Agent, or Firm* — Vierra Magen Marcus LLP

(57) ABSTRACT

To simulate the effect of shadows on specular lighting in an image being rendered, a specular volume is determined for a region of the image being rendered and used to determine the region of a light source that could provide a specular lighting contribution in the frame region. A set of geometry that could cast a shadow in the frame region is then determined and used, together with the determined region of the light source that could provide a specular lighting contribution, to determine a specular light source visibility parameter for sampling positions in the frame region. The determined specular light source visibility parameters are then used to modulate the specular lighting from the light source when shading the geometry in the frame region to produce the rendered output image for the frame region.

17 Claims, 19 Drawing Sheets

(56) References Cited

U.S. PATENT DOCUMENTS

| | | | |
|---|---|---|---|
| 2004/0207623 A1* | 10/2004 | Isard | G06T 15/04 345/426 |
| 2004/0239673 A1 | 12/2004 | Schmidt | |
| 2004/0263511 A1 | 12/2004 | West | |
| 2005/0134588 A1 | 6/2005 | Aila | |
| 2007/0247472 A1 | 10/2007 | Tong | |
| 2008/0049017 A1 | 2/2008 | Shearer | |
| 2013/0187947 A1 | 7/2013 | Barringer | |
| 2013/0241938 A1 | 9/2013 | Gruber | |
| 2013/0328873 A1 | 12/2013 | Harada | |
| 2014/0176529 A1 | 6/2014 | Meixner | |
| 2014/0300619 A1 | 10/2014 | Hasselgren | |
| 2015/0042655 A1 | 2/2015 | Gautron | |
| 2015/0254889 A1 | 9/2015 | Bakalash | |
| 2015/0317825 A1 | 11/2015 | Hazel | |
| 2016/0093098 A1 | 3/2016 | Anderson | |
| 2016/0203635 A1 | 7/2016 | Wyman | |
| 2016/0260249 A1 | 9/2016 | Persson | |
| 2017/0365090 A1 | 12/2017 | Hazel | |

OTHER PUBLICATIONS

GB Combined Search and Examination Report dated Apr. 19, 2017, GB Patent Application No. 1618897.1.

GB Search Report dated Oct. 20, 2014 in Great Britain Patent Application No. GB1407609.5, 3 pages.

Martin, Sam "Real Time Area Lighting Now and Next" Geomerics, AltDevConf 2012, 51 pages.

Burns, et al. "The Visibility Buffer: A Cache-Friendly Approach to Deferred Shading" Journal of Computer Graphics Techniques, pp. 55-69, vol. 2, No. 2, 2013.

Sintorn, et al. "An Efficient Alias-free Shadow Algorithm for Opaque and Transparent Objects using per-triangle Shadow Volumes" Proceedings of the 2011 SIGGRAPH Asia Conference, Article No. 153, 10 pages.

Sintorn, et al. "Per-Triangle Shadow Volumes Using a View-Sample Cluster Hierarchy" Proceedings of the 18th meeting of the ACM SIGGRAPH Symposium on Interactive 3D Graphics and Games, 2014, pp. 111-118.

GB Combined Search and Examination Report dated Dec. 8, 2016, GB Patent Application No. GB1610608.0.

PCT Patent Application No. PCT/GB2017/050365, filed Feb. 10, 2017.

Response to Office Action dated Apr. 10, 2019, in U.S. Appl. No. 15/625,597, filed Jun. 16, 2017.

Final Office Action dated Apr. 24, 2019, in U.S. Appl. No. 15/625,597 filed Jun. 16, 2017.

* cited by examiner

GRAPHICS PROCESSING SYSTEMS

BACKGROUND

The technology described herein relates to graphics processing systems and in particular to methods of and apparatus for taking account of the effect of shadows when rendering images for display.

When rendering images, such as output frames, for display in graphics processing systems, it is often desirable to take account of the effect of shadows in the scene being rendered.

The Applicants have previously proposed in their GB Patent Application GB-A-2525636 a technique that is particularly suitable for taking account of the effect of shadows on "diffuse" lighting (i.e. non-directional, "matte" lighting) when rendering images (frames) for output.

However, as well as determining the effect of shadows on "diffuse" lighting in an image being rendered, it would also be desirable to consider and take account of the effect of shadows in relation to "specular" lighting (i.e. sharp, "mirror-like" highlights) in an image being rendered. This can be more difficult to achieve than when considering shadows in relation to "diffuse" lighting, because, for example, depending on the lit material, a specular highlight may be caused by a very small part of a light source, and/or materials with sharp specular highlights can tend to give rise to high-frequency lighting variations (in contrast to diffuse lighting which will tend to give rise to lower frequency lighting variations).

The Applicants accordingly believe that there remains scope for improved techniques for taking account of the effect of shadows on specular lighting in an image being rendered in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
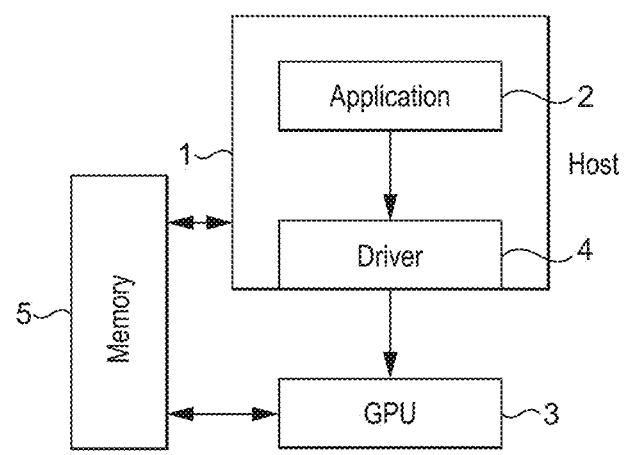
FIG. 1 shows an exemplary computer graphics processing system.

A first embodiment of the technology described herein comprises a method of operating a graphics processing system when rendering a frame for output that includes a light source that could cast shadows, the method comprising:

for at least one region of the frame being rendered:

determining a specular volume for the region of the frame being rendered;

using the determined specular volume to determine the region of a light source to be considered for the frame that could provide a specular lighting contribution in the region of the frame being rendered;

determining a set of the geometry to be processed for the frame that could cast a shadow from the light source being considered for the region of the frame being rendered; and for each sampling position of a set of sampling positions for the region of the frame being rendered, determining a specular light source visibility parameter using the determined set of geometry and the determined region of the light source that could provide a specular lighting contribution in the region of the frame being rendered.

A second embodiment of the technology described herein comprises a graphics processing system comprising:

processing circuitry, including at least a rasteriser that rasterises input primitives to generate graphics fragments to be processed, each graphics fragment having one or more sampling points associated with it, and a renderer that processes fragments generated by the rasteriser to generate output fragment data;

and wherein the graphics processing system is configured to, when rendering a frame for output that includes a light source that could cast shadows:

for at least one region of the frame being rendered:

determine a specular volume for the region of the frame being rendered;

use the determined specular volume to determine the region of a light source to be considered for the frame that could provide a specular lighting contribution in the region of the frame being rendered;

determine a set of the geometry to be processed for the frame that could cast a shadow from the light source being considered for the region of the frame being rendered; and for each sampling position of a set of sampling positions for the region of the frame being rendered, determine a specular light source visibility parameter using the determined set of geometry and the determined region of the light source that could provide a specular lighting contribution in the region of the frame being rendered.

The technology described herein is directed to a method of and apparatus for taking account of the effect of shadows on specular lighting when rendering frames (images) for output.

In the technology described herein, a specular volume for a region of an output frame is determined, and then used to determine a region of a light source to be considered for the frame that could make a specular lighting contribution in the region of the frame being considered. A set of geometry that could cast a shadow in the region of the frame is also determined, and then used, together with the determined light source region, to determine specular light source visibility parameters for sampling positions of the frame region. As will be discussed further below, these specular light source visibility parameters can then be used to simulate the effect of shadows on the specular lighting at the sampling positions when rendering the frame for output.

As will be discussed further below, the technology described herein comprises a technique for handling the effect of shadows on specular lighting in a frame being rendered in a manner that does not lead to significantly increased processing requirements for simulating the specular lighting when rendering a frame, but that can still provide a sufficiently accurate and visually appropriate and pleasing result. The technique is geometrically accurate and can give accurate visibility results for any specular lighting contribution in a frame being rendered, but without unduly increasing the processing burden when rendering a frame for output.

Thus, in embodiments, the technology described herein can significantly reduce the memory and bandwidth required for handling specular lighting contributions when rendering frames for display, as compared with conventional techniques for determining specular lighting contributions (whilst still maintaining satisfactory rendering quality).

The technology described herein can also efficiently be combined with the Applicant's previous techniques for determining diffuse lighting contributions, to thereby provide accurate soft shadows (from the diffuse lighting), combined with accurate shadows in the specular highlights from the determined specular lighting contributions.

The technology described herein should (an in an embodiment does) produce some useful output data e.g. an array of image data for display of an image.

The region of a frame that is being considered for the operation in the manner of the technology described herein can be any desired and suitable region of the frame. It would be possible to consider the frame as a whole (in which case there would be a single region comprising the entire frame), but in an embodiment the frame is divided into plural smaller regions, and at least one, and in an embodiment plural (and potentially each), of those regions is processed in the manner of the technology described herein. In this case, the processing in the manner of the technology described herein may be performed for each region that the frame is divided into, or it may be performed for some but not all of the regions that the frame is divided into. Where a frame is processed as multiple frame regions, the processing is in an embodiment done on a region-by-region basis.

The regions of the frames that are considered in the technology described herein can be any suitable and desired regions of the frames. In an embodiment, each frame region represents a different part (region) of the frame in question. Each region should and in an embodiment does represent an appropriate portion (area) of the frame.

While it would be possible for each region to correspond to a single sampling position (data position) within the frame, in an embodiment each region corresponds to a plurality of sampling positions (data positions) within the frame, such as an appropriate two-dimensional array of sampling positions within the frame. Thus in an embodiment, each region of a frame that is considered for the operation in the manner of the technology described herein comprises a group of plural sampling positions (data positions) within the frame.

In an embodiment, the frame regions are regularly sized and shaped, in an embodiment in the form of rectangles (including squares). However, this is not essential and other arrangements could be used if desired.

In an embodiment, the sampling positions for a frame are organised (sorted) into groups to thereby provide frame regions (corresponding to the groups of sampling positions) for processing in the manner of the technology described herein. This may be done in any suitable and desired manner. In one embodiment, the sampling positions are grouped (in an embodiment solely) based on their positions within the frame, e.g., and in an embodiment, so as to divide the frame into regions that each contain a contiguous array of sampling positions. In this case suitable region sizes could be, e.g., 8×8, 16×16, 32×32 sampling positions in the frame.

It would be possible to also or instead (and in an embodiment also) use other criteria for grouping the sampling positions within a frame into regions for the purposes of the operation in the manner of the technology described herein. Thus, other factors that could affect specular lighting at the sampling positions are in an embodiment also considered for the purposes of grouping sampling positions within a frame into regions for the purposes of the operation in the manner of the technology described herein. These factors in an embodiment comprise one or more of, and in an embodiment all of: the normal directions at the sampling positions; the specular volumes and/or directions for/of the sampling positions; and the "material" properties of the sampling positions that are to be used for the specular lighting determination (e.g. indicative of roughness/smoothness).

In the latter case, for example, sampling positions could be organised into groups for the purpose of defining regions for the operation in the manner of the technology described herein based on the relative "shininess" of the sampling positions, e.g., and in an embodiment, such that more "shiny" sampling positions are grouped together and treated separately from "duller" sampling positions. Thus, for example, sampling positions could be organised into regions for the purposes of the operation of the technology described herein based on material properties or properties that define their "shininess", and so as, e.g., to group sampling positions that have "shininess" values falling within particular, in an embodiment selected, in an embodiment predefined, ranges together.

In an embodiment, the sampling positions are sorted into groups for the purposes of dividing the frame into regions to be processed in the manner of the technology described herein based (at least in part) on a determined specular volume for each sampling position. In an embodiment, sampling positions having similar specular volumes (e.g. such that they substantially overlap) are grouped together to form a region for the operation in the manner of the technology described herein.

Thus, in an embodiment, the sampling positions for the frame being rendered are organised (sorted) into regions for the operation in the manner of the technology described herein based on their positions, and one or more other parameters that could affect the specular lighting at the sampling positions, such as, and in an embodiment, one or more of: the normal directions for the sampling positions, material properties of the sampling positions; and specular volumes for the sampling positions.

In an embodiment, it is (first) determined for plural, and in an embodiment for each, sampling position in the frame being rendered, whether that sampling position will have any specular lighting contribution (will require a specular visibility computation) (e.g. sampling positions for which the specular volume doesn't intersect a light source at all will have zero specular lighting contribution). In an embodiment, any sampling position found to have a zero specular contribution is disregarded, and then any remaining sampling positions having non-zero specular contributions (ignoring the effect of any occlusion of the light sources at the sampling positions) are sorted into groups in one of the manners discussed above to provide regions of the frame that are then processed in the manner of the technology described herein for the purposes of their specular lighting.

Where each frame is already sub-divided into regions for the purpose of its processing, then in an embodiment, each region of the frame that is considered in the manner of the technology described herein corresponds to a region that the frame is otherwise divided into for processing purposes. This could be the case where, for example, the graphics processing system is a tile-based system and the graphics processing, etc., is to be carried out in a tile-based fashion, for example using a tile-based graphics processing unit.

Thus, in an embodiment, each region of the frame that is considered in the manner of the technology described herein corresponds to one or more tiles of the frame. In an embodiment, each region that is considered corresponds to a (single) tile that a graphics processor or system that is generating the frame in question operates on and produces as its output (i.e. the regions are the tiles that the frames are divided into for processing (rendering) purposes), although other arrangements, such as each region comprising a plurality of tiles or a part of a tile, would be possible if desired.

In these arrangements of the technology described herein, the processing (rendering) tiles that the frames are divided into can be any desired and suitable size or shape, but are in an embodiment of the form discussed above (thus in an embodiment rectangular (including square), and in an embodiment 8×8, 16×16 or 32×32 sampling positions in size).

The set of sampling positions of a region of the frame being rendered that a specular light source visibility parameter is determined for can be any desired and suitable set of sampling positions.

In an embodiment, the set of sampling positions of a region of the frame being rendered that a specular light source visibility parameter is determined for comprises the set of sampling positions that will be processed for the frame region when producing (rendering) the (e.g., and in an embodiment final) output for the frame region (thus, a specular light source visibility parameter value is in an embodiment determined for each (screen space) sampling position of the region of the frame (e.g. tile) being rendered).

It would also be possible to vary the resolution at which the specular light source visibility parameters are determined based, e.g., and in an embodiment, on the material properties of the sampling positions in question. For example, specular light source visibility parameters could be determined at a higher spatial resolution for (e.g., "shinier") sampling positions that will have higher frequency specular highlights, with (e.g. "specularly" "duller") sampling positions that will have lower frequency highlights having specular light source visibility parameters determined at a lower spatial sampling frequency (and in an embodiment, that is what is done). Thus, in an embodiment, the spatial sampling frequency (resolution) of the set of sampling positions for a region of a frame that specular light source visibility parameters are determined for is selected based on specular properties of the frame region.

Where the output frame is divided into plural regions, e.g. processing tiles, then while it would be possible to process each such region, e.g. tile, in the manner of the technology described herein, in an embodiment that is done for selected regions only, and in an embodiment only for regions that meet certain, in an embodiment selected, in an embodiment predefined, criteria or conditions. In an embodiment only those regions that it is determined could be lit by a (by at least one) light source are processed in the manner of the technology described herein. Thus, a or plural (and in an embodiment each, where there is more than one) light source is in an embodiment culled against the frame regions to identify the frame regions that could be lit by the light source(s) (to identify the frame regions that contain geometry that could be affected by the light source(s)).

Thus in an embodiment, the frame being rendered is divided into (and is to be processed as) plural distinct regions, and it is first determined which of the regions that the frame has been divided into could be lit by a light source for the frame (e.g. the light source being considered), and then some or all (and in an embodiment each) of those determined frame regions are processed in the manner of the technology described herein.

The frame regions that could be lit by a light source can be determined as desired. In an embodiment it is determined whether a (and each) region is within the light's volume of influence (with regions that are outside the volumes of influence of all the light sources to be considered then not being processed in the manner of the technology described herein). It would also or instead (and in an embodiment also) be possible for regions whose geometry all faces away from the light source to be discarded from processing in the manner of the technology described herein.

In an embodiment, it is determined for each frame region, which light sources (if any) for the frame could affect that frame region. In an embodiment a list of the light sources that could affect a frame region is generated for and stored in association with (is associated with) each frame region that the frame has been divided into.

While it would be possible in this regard simply to consider the frame regions and the light source's volume of influence in general, in an embodiment, the process of determining whether a (and each) region could be lit by a (by at least one) light source is done using the determined specular volumes for the frame regions. Thus, in an embodiment, it is determined whether a determined specular volume for a (and for each) frame region is within a light source's volume of influence (whether the specular volume for the frame region intersects the light source's volume of influence) to determine whether the frame region could be lit by the light source for the purposes of a specular lighting contribution (with any frame regions whose specular volumes do not intersect with the volume of influence of any light source then not being processed further for the specular lighting determination). This is in an embodiment repeated for each light source that needs to be considered.

In other words, in an embodiment, it is first determined for which frame regions the specular volume could intersect a light source at all, and then a specular light source visibility parameter determination is carried out for those frame regions only.

Thus, in an embodiment, the method of the technology described herein comprises (and the graphics processing system is configured to):

dividing a frame to be rendered for output into a plurality of regions;

for each region of the frame, determining a specular volume for the region of the frame;

using the determined specular volume to determine whether the region of the frame could be lit by a light source so as to cause specular lighting in the frame region; and for a, and in an embodiment each, frame region that it is determined could be subjected to specular lighting for a light source:

using the determined specular volume for the region to determine a region of a light source to be considered for specular lighting in the frame region;

determining a set of geometry that could cast a shadow in the frame region; and determining specular light source visibility parameters for sampling positions of a set of sampling positions for the frame region (as discussed above).

The specular volume for a frame region can be determined in any suitable and desired manner. The specular volume should be indicative of the directions from which light can contribute to specular lighting for the region of the frame being considered. Thus, the specular volume should represent the bounds for the specular contribution for the region of the frame being rendered.

The specular volume will depend, e.g., and in an embodiment, upon the material properties for the sampling position or positions being considered, the normal direction, and the view direction (camera parameters). For a single sampling position the specular volume can be, and is in an embodiment, determined using the view (camera) direction, material properties (roughness), and light source properties. For a larger region, the specular volume is in an embodiment the union of the per-sampling position volumes.

In an embodiment, the specular volume for the region of the frame being rendered is determined by determining a respective specular volume for plural, and in an embodiment for each, sampling position in the region of the frame being considered, and then determining a specular volume for the frame region itself as a combination of the specular volumes for the individual sampling positions. In an embodiment a specular volume comprising the "superset" of the specular volume intersections for the sampling positions is determined and used as the specular volume for the region of the frame.

The specular volume for a given sampling position will typically be in the form of a cone. Thus, in an embodiment, a specular cone is determined for a sampling position or positions for the region of the frame being rendered, and, in an embodiment, a specular cone is determined for the region of the frame being rendered. However, the specular volumes need not be exactly conical, and could have other shapes if desired.

Once the specular volume for the region of the frame being considered has been determined, then that specular volume is used to determine the region of a light source to be considered for the frame that could provide a specular lighting contribution in the region of the frame being rendered. This can again be done in any suitable and desired manner.

In an embodiment, the determined specular volume for the frame region is intersected against the area of the light source being considered, to thereby determine the region of the light source that could provide a specular lighting contribution in the region of the frame being rendered. This will accordingly indicate for the frame region, which part of the light source needs to be considered for the purposes of specular lighting.

Depending upon the extent of the specular volume for the region being considered, and the size of the light source, it may be the case, and in embodiments is the case, that the region of the light source to be considered that could provide a specular lighting contribution comprises only some but not all of the overall area of the light source (i.e. will be a subset (a sub-area) of the area of the light source).

Thus, in an embodiment, the region of a light source that could provide a specular lighting contribution in a frame region is determined based on (and in an embodiment as) the part of the light source which intersects the specular volume for the frame region.

Identifying the region (part) of a light source that could provide a specular lighting contribution facilitates more efficient processing for the later stages of the operation in the manner of the technology described herein, as it enables, for example, only a smaller area of a given light source to be considered for the purposes of determining specular light source visibility parameters for sampling positions for a region of a frame being rendered (where that is possible/appropriate).

Correspondingly, as discussed above, if it is determined from the specular volume that no part of a light source to be considered for the frame could provide a specular lighting contribution in a frame region, then in an embodiment further specular lighting determination for that frame region is omitted.

The set of geometry for a frame region that could cast a shadow from a light source can be determined in any suitable and desired manner. The geometry that is considered is in an embodiment in the form of graphics primitives, and in an embodiment triangles, but this is not essential, and other forms of geometry could be used and considered, if desired.

In an embodiment a set of geometry for a frame region that could cast a shadow from the light source(s) is determined by determining whether a "splitting" plane for which the geometry that is being considered (e.g. a bounding volume for the geometry) lies on one side of the plane, and (at least the relevant part of) the light source being considered and the frame region being considered lie on the other side of the plane, exists or not. If such a splitting plane exists, then it is determined that the geometry in question should not cast a shadow for the frame region being considered, but if such a splitting plane does not exist then the geometry is considered as (potentially) being able to cast a shadow for the frame region being considered, and so is, in an embodiment, included in the set of geometry that could cast a shadow from the light source for the frame region in question. This process is in an embodiment repeated for each light source that falls to be considered for a frame region (and for each geometry element (e.g. graphics primitive, that falls to be considered for the frame region).

In this case, a light source could be considered in its entirety (i.e. the total area of the light source being considered could be used). However, in an embodiment, the "splitting plane" test is based on (and uses), (only) the determined region of the light source that could provide a specular lighting contribution in the frame region. In this case, where it has been identified that only a smaller part (region) of the light source could provide a specular contribution in the frame region, then the "splitting plane" test will be based on that smaller, determined region of the light source (rather than the entire (area of) the light source).

This then has the advantage that a potentially reduced set of potentially occluding geometry will be determined, as a smaller area of the light source only will be being considered. Thus, in an embodiment, the set of geometry that could cast a shadow from a light source for a frame region is determined using only the determined region of the light source that could provide a specular lighting contribution in the frame region.

Determining a (potentially) reduced set of geometry by only considering the "specular" region for the light source will tend to reduce the amount of geometry that needs to be considered for later stages of the specular lighting determination, thereby allowing the process to operate in a more efficient manner.

In an embodiment, the set of geometry for a frame region that could cast a shadow from a light source is determined by determining a bounding frustum or frustums that (together) contain all the visible geometry in the frame region and (at least the relevant part of) the light source being considered. Such a frustum can be constructed as desired (e.g. using any suitable known technique for determining such frustums), for example, and in an embodiment, by determining a minimum and a maximum depth value of the geometry, as seem from the camera (view point) for the frame region (knowledge of the camera position and orientation will then allow a bounding volume for the geometry to be reconstructed) and then using that and, e.g., the area of the frame region and of the light source in question, to construct a bounding frustum (or frustums) for the light source in question. This can be done in view (camera) space or in world space.

In this case, the bounding frustum could contain the entirety of the light source being considered (i.e. be based on the total area of the light source being considered). However, in an embodiment, the bounding frustum is, similarly to the "splitting plane" test discussed above, based on (and uses) (only) the determined region of the light source that could provide a specular lighting contribution in the frame region. In this case, where it has been identified that only a smaller part (region) of the light source could provide a specular contribution in the frame region, then the bounding frustum will be based on (will contain) (only) that smaller, determined region of the light source (rather than the entire (area of) the light source).

In an embodiment, a single bounding frustum that contains all the visible geometry in the frame region and the (desired part of the) light source being considered is generated for the frame region.

In another embodiment, plural bounding frustums are generated for a frame region. In this case, each bounding frustum should contain some of (but not necessarily, and in an embodiment not, all of) the geometry in the frame region and the (desired part of the) light source, with all the bounding frustums together containing all the visible geometry in the frame region. Using plural bounding frustums may be preferable where there are large depth and/or spatial position discontinuities in the geometry for a region, for example where the geometry can be split into disjoint groups that are themselves local but relatively far apart from each other.

The set of geometry that could cast a shadow from the light source is in an embodiment then determined by determining for each geometry object (e.g. primitive, e.g. triangle), whether or not it intersects the light source bounding frustum (or at least one of the bounding frustums, where plural bounding frustums are being used) for the region. Any geometry that is determined to intersect the (or any one of the) light source bounding frustum(s) is in an embodiment then included in the determined set of geometry that could cast a shadow (affect the shadow being cast) in the frame region, but any geometry that is determined not to intersect the (or any of the) bounding frustum(s) is in an embodiment not included in the determined set of geometry that could affect the shadow being cast. (This is on the basis that to be able to cast a shadow in the frame region in question, the geometry object (e.g. primitive) must intersect a bounding frustum that includes the (relevant part of the) light and the geometry for the frame region.)

The determination of whether any geometry for a frame region intersects a light source bounding frustum can be performed as desired, and in any suitable manner. For example, it would be possible simply to test each object, e.g. primitive (e.g. triangle) for a frame region against the bounding frustum(s) in turn, to, e.g., and in an embodiment, prepare a list of geometry that could cast a shadow in the frame region.

However, in an embodiment, more efficient testing mechanisms are used. For example, a hierarchical testing arrangement, in which larger size representations of geometry objects, and/or of the frame regions and/or of the light source bounding frustums are first tested, and then progressively sub-divided and tested again (if required), could be used to make the testing process more efficient (and in an embodiment, this is what is done).

Thus, in an embodiment, the light source bounding frustum intersection testing process operates to iteratively test a light source bounding frustum against progressively smaller representations of the frame geometry down to a given, in an embodiment selected, in an embodiment predetermined, minimum geometry object (which is in an embodiment a primitive), discarding any geometry representations that do not intersect the light source bounding frustum (at least in part), and then including in the set of geometry any geometry found to intersect at least in part the light source bounding frustum.

In such arrangements, there is in an embodiment a separate hierarchy for the frame region light source bounding frustums and a separate hierarchy for the geometry.

In the case of the geometry, large static meshes, for example, could be pre-processed to determine bounding volumes for sub-sets of their primitives, which could then be intersection tested (with the bounding volumes being progressively sub-divided as required).

For the frame regions, light source bounding frustums for larger groupings of frame regions could first be tested and then the individual frame regions light source bounding frustums tested (if required). For example, the light source bounding frustums for individual frame regions (e.g., tiles) could be used to construct bigger light source bounding frustums for sets of plural frame regions, e.g., for 2×2, 4×4 and/or 8×8 neighbouring frame regions (tiles).

Correspondingly, where the determination of whether geometry that could cast a shadow in a frame region exists comprises determining whether a splitting plane that lies between the frame region and the potentially occluding geometry exists, then in an embodiment, a hierarchical testing arrangement, in which a larger size representations of the geometry objects, and of the frame regions are first tested, then progressively subdivided and tested again (if required), is used.

In an embodiment, the sets of geometry that could cast shadows in the frame regions are determined by sorting a set of primitives to be processed for the frame into plural subsets of primitives, and then using the subsets of primitives when determining the sets of geometry that could cast a shadow for the frame regions. This may allow these processes to be performed in a more efficient manner.

In an embodiment, a set of (plural) primitives to be processed for the frame for output is divided into plural subsets of primitives, such that each primitive is allocated into one subset of primitives only, and each subset of primitives contains only contiguous primitives. In an embodiment, data representative of the primitives of the subset of primitives, and data indicating the volume of space that the subset of primitives falls within, is generated and stored for each subset of primitives that the set of primitives has been divided into.

The set of primitives may comprise all of the primitives that are to be processed for the frame, but in an embodiment comprises some but not all of the primitives to be processed for the frame. In this latter case, the set of primitives in an embodiment comprises a particular, identifiable set of primitives for the frame. In an embodiment, the set of primitives comprises a set of primitives that share a common transformation (e.g. translation and rotation—i.e. they are to be transformed by the same world matrix). In an embodiment, the set of primitives comprises all the static geometry for a frame. Such sets of primitives may comprise a single draw call, but this isn't necessary and they could comprise plural draw calls (e.g. with the same world matrix and/or that all contain static geometry) if desired.

Where the set of primitives does not comprise all the primitives for the frame (i.e. there are plural sets of primitives (e.g. draw calls) to be processed for the frame), then the process is in an embodiment performed for plural of (and in an embodiment for each of) the sets of primitives (e.g. draw calls) for the frame (and in an embodiment repeated for each set of primitives (e.g. draw call) for the frame).

The set of primitives is divided into subsets of contiguous primitives. In an embodiment, a primitive is considered to be contiguous with another primitive, if the primitives share an edge (if it shares an edge with that other primitive).

Thus, in an embodiment, the set of primitives is divided into plural subsets of primitives, such that each primitive is allocated into one subset of primitives only, and each subset of primitives contains only primitives that share a common edge with at least one other primitive in the subset of primitives. (It should be noted in this regard that all the primitives in a subset of primitives do not have to share the same common edge, rather the requirement is that each primitive in the subsets of primitives shares a common edge with another primitive in the subset of primitives (i.e. that there is no primitive in the subset of primitives that does not share a common edge with another primitive in the subset of primitives).)

The process of creating subsets of primitives is in an embodiment continued until all the primitives in the set of primitives being processed have been allocated to a subset of primitives.

If (when) no adjacent, contiguous unallocated primitive in the set of primitives is found, then the current subset of primitives that is being formed should be, and is in an embodiment, considered to be "complete", i.e. is finished, and a new subset of primitives is in an embodiment then started by selecting a new unallocated primitive to start a new subset of primitives with.

In the case where there is more than one unallocated primitive that is contiguous with the (primitive(s) of) current subset of primitives that is being considered (e.g., and in an embodiment, that shares an edge with a primitive of the subset), then in an embodiment one of the contiguous primitives is selected to add to the subset of primitives, in an embodiment based on one or more selection criteria, such as, and in an embodiment, the facing directions of the candidate adjacent primitives that could be added to the subset and the facing direction of an existing primitive or primitives of the subset, and/or the effect that the new primitive will have on the size of the subset of primitives (e.g. on the increase that there would be in the size of the subset of primitives if the adjacent primitive is added to the subset).

(The "size" of a subset of primitives in this regard is in an embodiment considered in terms of the size of the bounding volume (box) for the subset of primitives, e.g., and in an embodiment, in terms of its extent in each axis direction, and/or the length of its diagonal or diagonals, etc.)

In an embodiment, each subset of primitives is allowed to contain no more than a particular, in an embodiment selected, and in an embodiment predefined, number of vertices.

The data that is stored for each subset of primitives comprises data representative of the primitives of the subset of primitives and data indicating the volume of space that the subset of primitives falls within.

The data representative of the primitives of a subset of primitives can be any suitable and desired data that can represent the primitives of the subset of primitives. In an embodiment, this data at least allows the outer edges of the subset of (contiguous) primitives to be determined.

In an embodiment, the data that is stored for each subset of primitives comprises a set of vertex positions (in an embodiment in the form of a set of vertex indices) for the subset of primitives and additional topology data that, together with the vertex positions, can be used to determine the topology of the primitives in the subset of primitives in question.

The data that is stored for a subset of primitives that represents the volume of space that the subset of primitives falls within (occupies) can take any suitable and desired form. In an embodiment, this data indicates a bounding volume for the subset of primitives, and in an embodiment an axis aligned bounding volume for the subset of primitives.

The data for the set of primitives that is being processed can be stored in any suitable and desired manner, e.g. in any suitable and desired (overall) data structure.

In an embodiment, the data for the subsets of primitives is stored as a tree representation for representing the set of primitives, with each leaf node of the tree representing one of the subsets that the set of primitives has been divided into, and there being stored for each leaf node of the tree, data for the corresponding subset of primitives as discussed above.

Correspondingly, each parent node of the tree should and in an embodiment does represent a sub-set of primitives corresponding to the combination of the sub-sets of primitives of all of its child nodes.

Where a set of primitives to be considered for a frame is divided into subsets of primitives in the above manner, then the set of geometry to be processed for the frame that could cast a shadow from a light source to be considered for the frame in a, and in an embodiment in each, frame region that is to be considered, is in an embodiment determined by determining which subsets of primitives that the set of primitives have been divided into could cast a shadow from a light source in the frame region(s) to be considered. Thus, in an embodiment, a set of subsets of primitives for the frame that could cast a shadow from a light source is determined for a, and in an embodiment for plural, and in an embodiment for each, frame region that is being considered. In an embodiment a set of subsets of primitives that could cast a shadow is determined for each respective light source for each respective frame region to be considered.

The subsets of primitives that could cast a shadow from a light source for a frame region are in an embodiment determined in one of the ways discussed above, namely either using a "splitting plane" test, or by testing a frame region light source bounding frustum(s).

Again, in an embodiment, a hierarchical testing arrangement is used to make the testing process more efficient.

Other culling operations could also or instead (and in an embodiment also) be used to identify subsets of primitives that do not need to be included in a set of subsets of primitives that could cast a shadow in a frame region, if desired. For example, and in an embodiment, the bounding volumes of the subsets of primitives could be tested against the volume of influence of the light source(s) in question, with any subsets of primitives that fall outside the light volume(s) of influence then being culled (not considered further and not included in a set of subsets of primitives to be processed).

In an embodiment, it is also determined whether a subset of primitives can be guaranteed to only contain primitives that are all facing in the same, particular, in an embodiment selected, direction (e.g. contains primitives that are all guaranteed to be front-facing, or contains primitives that are all guaranteed to be back-facing), with such subsets of primitives then, e.g. either being included or discarded from the subsets of primitives to be processed further.

The output of the processing (testing) of the geometry, e.g. subsets of primitives, is in an embodiment, a set or sets of geometry (e.g. of subsets of primitives) that could cast a shadow for the (and for each) frame region that was considered (tested). This output can take any desired and suitable form, but in an embodiment comprises a list or lists of geometry, e.g. subsets of primitives, indicating the geometry (e.g. subsets of primitives of a set of primitives), that could cast a shadow for the (and for each) frame region that was considered (tested).

Once the set of geometry that could cast a shadow from a light source (whether in the form of a set of subsets of primitives, a set of primitives, or otherwise), has been determined for a frame region, then that set of geometry is used to determine specular light source visibility parameters for one or more sampling positions for the frame region.

This may, and in an embodiment does, use any information representative of the geometry in an appropriate manner to allow the geometry to be used to determine a light source visibility parameter for the sampling positions.

Thus, for example, where subsets of primitives are represented in the manner discussed above, then in an embodiment, the information representative of the primitives in a (and in each) subset of primitives (such as the vertex indices and any topology information) is used to, in effect, (re-)construct the primitives of the subset of primitives in question such that those primitives can then be processed in the desired manner.

The specular light source visibility parameter that is determined for a sampling position in the frame region being considered from the determined set of geometry can be any desired and suitable parameter that can be used to provide the desired shadowing effect in the rendered output frame.

In an embodiment it is a value that can be (and that is to be) used to modulate the (specular) effect of the light source at the sampling position in question to provide (and to represent or simulate) the shadowing effect at that sampling position. In this case, the specular light contribution from the light source if it were completely unoccluded is in an embodiment multiplied by the specular light source visibility parameter to give a "net" specular light contribution from the light source to the frame region sampling position in question when rendering (shading) the frame region.

In an embodiment, the specular light source visibility parameter for a (and for each) frame region sampling position indicates directly the "net" specular light contribution from the light source to the frame region sampling position in question (and thus is to be used as the "net" specular light contribution from the light source to the frame region sampling position in question when rendering (shading) the frame region).

Other arrangements would, of course, be possible.

In an embodiment, the specular light source visibility parameter for a sampling position is representative of (is indicative of), and dependent upon, how much light from the light source will fall upon the sampling position in question. This parameter can then be used to simulate the specular effect of the light source at the sampling position in question when the output frame is rendered.

In an embodiment, a single specular light source visibility parameter that is to be applied to all the colour channels is determined for a (and for each) frame region sampling position. In another embodiment, separate specular light source visibility parameters are derived for different colour channels. In this case, a separate specular light source visibility parameter is in an embodiment derived for each colour channel (although the separate specular light source visibility parameters may be determined to have the same value).

The specular light source visibility parameter for a sampling position can be determined as desired and in any suitable manner from the determined set of geometry (e.g. primitives) for the frame region.

In an embodiment, it is estimated how much light from the light source will fall upon the frame region sampling position in question. This can be estimated as desired, but in an embodiment, it is based, at least in part, on whether and how much of the light source is visible at the frame region sampling point in question, i.e. whether any of the geometry in the determined set of geometry that could cast a shadow in the frame region will occlude the light source from the sampling position.

In an embodiment, this operation uses and only considers the determined region of the light source that could provide a specular contribution in the frame region being considered. Thus, in an embodiment, the specular light source visibility parameter is based, at least in part, on whether and how much of the determined "specular" region of the light source is visible at a frame region sampling point, i.e. whether any of the geometry in the determined set of geometry that could cast a shadow in the frame region will occlude the determined "specular" region of the light source from the sampling position. Only considering the region of the light source that it has been determined could provide a specular contribution in the frame region being considered reduces the extent of an, e.g., area light, that needs to be considered for the specular lighting contribution, thereby, e.g., facilitating more rapid processing.

Whether and how much of the light source "specular" region is visible at a frame region sampling point can be determined in any suitable and desired manner, but in an embodiment this is done by testing whether, for each of one or more sampling positions representing the position of the "specular" region of the light source, a ray cast between the frame region sampling position in question and the light source sampling position would intersect geometry in the determined set of geometry that could cast a shadow at the frame region sampling position in question (i.e. could be occluded by any geometry in the determined set of geometry that could cast a shadow in the frame region or not).

In this process, the light source "specular" region could be represented by a single sampling position (and in an embodiment, this is the case). This may be appropriate where the light source is a point source.

In an embodiment, the light source "specular" region is represented by plural sampling positions. In this case, it is in an embodiment then tested for plural of (and in an embodiment for each of) the plural sampling positions that represent the light source "specular region", whether a ray cast between the frame region sampling position in question and the light source sampling position would intersect any geometry in the determined set of geometry that could cast a shadow at the frame region sampling position (i.e. could be occluded by any geometry in the determined set of geometry that could cast a shadow in the frame region or not).

Using a plurality of sampling points to represent the light source "specular" region allows the operation in the manner of the technology described herein to be used for, and to represent, area lights (i.e. light sources that have an area) in an efficient and effective manner. In this case, the light source "specular" region is in an embodiment represented by up to a few hundred sampling positions, e.g. 60-600, 64, 128, 256 or 512, sampling positions.

In particular, by only considering the region of the light source that it has been determined could provide a specular contribution in the frame region being considered, a higher density (resolution) of sampling positions representing the region of the light source being considered can generally be used, thereby facilitating determining the specular lighting contributions at a higher frequency (at a finer resolution) across the frame region (which is desirable for the purposes of accurately representing specular lighting contributions). Thus this can facilitate using a higher density (resolution) of sampling positions representing the light source for a given overall number of sampling positions that it is desired to process for a light source, as compared, for example, to arrangements in which the total area of the light source is considered.

Where plural sampling positions are used to represent a light source then the sampling positions can be arranged in any suitable and desired fashion. In an embodiment, the sampling positions are arranged as an array of sampling positions that represents (and corresponds to) the light source region in question. Thus, for an area light, for example, an array of sampling positions that covers (and corresponds to) the area of (occupied by) the light source (in an embodiment the area of the determined "specular" region only) is in an embodiment used. It would also be possible to use a three-dimensional array of sampling positions (and in an embodiment, this is done). This could be used, e.g., for and to represent light sources that have a volume.

The array of sampling positions should, and in an embodiment does, correspond to the shape (e.g. area or volume) of the light source (in an embodiment of the specular region only) in question. The sampling positions are in an embodiment regularly positioned (regularly spaced), as that will then facilitate the testing process. In an embodiment, a sampling position array that is designed to reduce the effect of (or the risk of) aliasing is used.

The testing of whether a light source sampling point will be visible from the frame region sampling position can be done in any desired and suitable manner. It is in an embodiment done using a rasterisation operation, in an embodiment by rasterising the geometry (e.g. primitives) in the determined set of shadow-casting geometry for the frame region onto a render target that corresponds to the light source sampling positions (with the frame region sampling position as the viewpoint).

Any suitable and desired rasterisation technique can be used for this testing process.

The light source sampling position occlusion testing can be used to provide the specular light source visibility parameter to be used for the frame region sampling position in question in any desired and suitable manner.

In an embodiment, it is determined whether each light source sampling position is occluded or not. In this case the output (render target) of the light source sampling position occlusion testing for a frame region sampling position can be, and is in an embodiment, an indication of whether each light source sampling position is occluded for the frame region sampling position in question, for example, and in an embodiment, in the form of a single bit per light source sampling position that can be set (or not) to indicate whether that light source sampling position is occluded or not. In this case, the render target output of the testing process may have 1-bit per light source sampling position and so may, e.g., and in an embodiment, only require a few hundred bits (such that it will, e.g., fit in registers and so can be generated and consumed locally, without the need to, e.g., export it to external, e.g. main, memory).

In these arrangements, the specular light source visibility parameter for the frame region sampling position in question is in an embodiment then determined, at least in part, from the indicated number of light source sampling positions that were found to be visible (or found to be occluded) by the testing process. For example, and in an embodiment, the number of visible light source positions (e.g. the number of set bits) can be counted and then used as (or used, at least in part, to derive) the specular light source visibility parameter for the frame region sampling position in question. Thus, in an embodiment, the specular light source visibility parameter for each frame region sampling position is based on the number of visible light source sampling positions at the frame region sampling position in question.

In one embodiment, the specular light source visibility parameter for each frame region sampling position is, or corresponds to, the ratio (the proportion) of the visible light source sampling positions to the total number of light source sampling positions at the frame region sampling position in question. The overall specular "contribution" of the light source if it were completely unoccluded could then be (and in an embodiment is) multiplied by this ratio to simulate the effect of shadows at the frame region sampling position in question.

It would also be possible to derive more sophisticated measures of the light falling on the frame region sampling position from the light source sampling position occlusion testing, if desired. This may result in more processing for the occlusion testing and larger render target outputs from the occlusion testing, but should provide a more accurate representation of the shadows that are being cast.

In an such embodiment, rather than solely determining the ratio (proportion) of visible light source sampling positions, for each non-occluded light source sampling position, a measure of the amount of light that will fall on the frame region sampling position from the light source sampling position in question is determined. In this case, in an embodiment an intensity parameter (value) is determined for the region of the light source that the unoccluded (visible) light source sampling position relates to. In this case, the, e.g., intensity parameter values could e.g., be stored for the light source sampling position in question in the render target output of the testing process, but in an embodiment, a running total intensity value is maintained as successive light source sampling positions are processed.

In these arrangements, the ratio of the determined overall amount of light falling on the frame region sampling positions to the amount of light that would fall on the frame region sampling point if the light source were completely unoccluded could then, e.g. be determined, and used as the specular light source visibility parameter for the light source sampling position in question (and then, e.g., the overall "contribution" of the light source if it were completely unoccluded could then be (and in an embodiment is) multiplied by this ratio to simulate the effect of shadows at the frame region sampling position in question. Alternatively, the determined overall amount of light falling on the frame region sampling position in question could be used as, or used at least in part to derive the specular light source visibility parameter for the frame region sampling position in question, and then, e.g., used directly as the amount of light from the light source falling on the frame region sample position in question when rendering (shading) the sampling position.

The amount of light that is falling on the frame region sampling position could be determined as desired. It could, for example, be, and in an embodiment is based on the distance (depth) of the frame region sampling position from the light source sampling position. This may be particularly appropriate for light sources that have "volume".

The amount of light that is falling on the frame region sampling position could also or instead be, and in an embodiment is also or instead, based on the amount of light that the light source sampling position in question is producing (in this case, each light source sampling position in an embodiment has associated with it an illumination parameter whose value indicates the amount of light being produced by that part of the light source). This may be useful where a light source's output can vary across its surface (or volume).

The, e.g., proportion (ratio) of visible light source sampling positions for, or the sum of the amount of light falling on, a frame region sampling position could be determined after the visibility testing render target output has been generated, or it could, e.g., be determined as the testing process proceeds, e.g., and in an embodiment, by maintaining a running count or total as each light source sampling position is tested.

It would also be possible to take account of other factors in the light source sampling position occlusion testing if desired. In an embodiment, this testing also takes account of transparency ($\alpha$ values) associated with the geometry objects being considered. For example, where "punch through" alpha (transparency) is being used, an alpha look-up to determine if the geometry in question will be opaque or transparent at the position in question in the output frame could be, and is in an embodiment, included in and used for the light source sampling position visibility test.

It would also be possible, e.g., to use a transparency ($\alpha$) value associated with an occluding object to modulate the determined amount of light falling on the frame region sampling position (and in an embodiment, this is done). For example, the $\alpha$ value could be used as or to derive a multiplying factor. This would then allow the effect of (occluding) semi-transparent surfaces to be taken account of more accurately.

The above process should be repeated for each frame region sampling position that a specular light source visibility parameter is to be determined for. As discussed above, the specular light source visibility parameter for a sampling position is in an embodiment a value (or values) that can be used to modulate the (unoccluded) specular contribution of the light source in a subsequent rendering pass to simulate the effect of the shadows at the sampling position in question. Each specular light source visibility parameter is accordingly, in an embodiment, a value between 0 and 1 that can be used to modulate the specular contribution of the light source. Other arrangements would, of course, be possible.

The determined specular light source visibility parameters for the frame region sampling positions can be used as desired to simulate the (determined) effect of the shadows on the specular lighting in the rendered output frame region. As discussed above, the determined specular light source visibility parameters are in an embodiment used to modulate the (specular contribution of the) light source at the sampling positions when determining the output, rendered, colour to be used for the frame region (screen space) sampling positions.

Thus, in an embodiment, the method of the technology described herein further comprises (and the graphics processing system of the technology described herein is further configured to) using the determined specular light source visibility parameters for the region of the frame being rendered when rendering an output version of the frame region, and in an embodiment to modulate the specular effect of the light source in question at each sampling position of the output version of the frame region.

The determined specular light source visibility parameters for a frame region could be provided as desired for use when rendering the frame region. For example, they could be written to (stored in) a frame region specular light source visibility buffer that is then, e.g., read (and used) in the (or a) subsequent rendering pass. In an embodiment, this is what is done. In this case, the specular light source visibility buffer could, e.g., be cached and retained "on-chip" for use in a subsequent rendering pass, or it could, e.g., be written out to main memory and then read back in when it is to be used.

In an embodiment, the specular light source visibility buffer is retained "on-chip" for use in a subsequent rendering pass, e.g., and in an embodiment, by caching it and/or storing it in registers of the graphics processing pipeline. The technology described herein facilitates such operation because the data required to store the specular light source visibility parameters for each frame region sampling position is relatively small. This saves both power and memory bandwidth.

Because the specular light source visibility parameters are determined per sampling position (on a sampling position basis), it would also be possible to determine a specular light source visibility parameter for a sampling position and then use it "immediately" in the or a subsequent, e.g., final, rendering pass for the sampling position in question.

Thus, in an embodiment, the method of the technology described herein comprises, and the system of the technology described herein is configured to, determine a specular light source visibility parameter for a sampling position of a frame region and then use the specular light source visibility parameter to determine a rendered output value for a (and in an embodiment for the) sampling position of the frame region, before determining a specular light source visibility parameter for another (e.g., and in an embodiment, the next) sampling position of the frame region.

Although the technology described herein has been described above with particular reference to the processing of a single frame region, it will be appreciated that the process should be, and is in an embodiment, repeated for each region (e.g. tile) that the frame has been divided into, at least that needs to be considered for specular lighting purposes (i.e. at least where there could be a specular lighting contribution and a light source could cast shadows).

Similarly, the process is in an embodiment repeated for plural frames of a sequence of frames, e.g. and in an embodiment, for each frame of a sequence of frames to be rendered that includes a light source or sources that could cast shadows.

Also, although the technology described herein has been described above with particular reference to the processing in respect of a given light source, it will be appreciated that the technology described herein can be extended to an arbitrary number of lights. In this case, the process of the technology described herein to determine specular light source visibility parameters should be, and in an embodiment is, repeated for each light source that could cast a shadow in a frame region. A separate set of specular light source visibility parameters (e.g. specular light source visibility buffer, where used) is in an embodiment determined for each light source being considered. In this case, the initial determination of the set of geometry that could cast a shadow, could, e.g., and in an embodiment, be amortized by considering all the lights at once.

The technology described herein may, e.g., consider (test) the geometry in "world-space" (and in an embodiment, this is what is done). However, depending on what hardware is available and what results are required, it would be possible to also or instead consider the geometry in (perform computations in) screen space, if desired.

It would also be possible to use the techniques of the technology described herein to determine the effect of shadows cast by moving objects (i.e. to account for "motion blur"). The technology described herein facilitates this, because it comprises, inter alia, a memory and bandwidth efficient mechanism for taking account of the effect of shadows.

To account for motion blur, multiple sets of specular light source visibility parameters for a frame region (and for the light source in question) are in an embodiment determined, for each of plural respective different instances in time (e.g. over the time period between frames), with the positions of the geometry in the frame being varied depending upon which instance in time the specular light source visibility parameter determination is being performed for and the motion of the object(s) in question.

The determined respective specular light source visibility parameters for each instance in time (geometry position) could then be, and are then in an embodiment, combined (e.g. averaged) to provide an appropriately "combined" specular light source visibility parameter for each frame region sampling position that will accordingly take better account of the motion of the geometry during the time interval of the frame.

As will be appreciated from the above, in an embodiment the method of the technology described herein comprises (and the graphics processing system is correspondingly configured to):

firstly determining unoccluded specular contributions for plural, and in an embodiment for each, sampling position of a frame being rendered (and in an embodiment discarding any sampling positions found to have zero specular contribution);

determining a specular volume for each sampling position;

sorting the sampling positions into groups based, e.g., on their positions, normal, and/or specular volumes, etc., to thereby create frame regions corresponding to the determined sampling position groups;

for a, and in an embodiment for plural, and in an embodiment for each, group of sampling positions (frame region):

determining a specular volume for the sampling position group (e.g., and in an embodiment, as the superset of the specular volumes for plural, and in an embodiment for each, sampling positions in the group);

determining the region (part) of a light source that could provide a specular contribution the frame region of the sampling position group based on the determined specular volume for the sampling position group;

determining a set of potentially light source occluding (shadow-casting) geometry for the group of sampling positions, in an embodiment based on the determined "specular" light source region for the sampling position group;

using the determined set of geometry and the determined light source specular region for the sampling position group to determine specular light source visibility parameters for plural, and in an embodiment for each, of the sampling positions of the group (frame region); and modulating the initially determined unoccluded specular contributions for plural, and in an embodiment for each, of the sampling positions in the group in accordance with (based on (using)) the determined specular light source visibility parameters for the sampling positions.

As discussed above, the technology described herein is directed to arrangements for determining the effect of shadows on specular lighting in a frame (image) being rendered. In an embodiment, the determination of the specular lighting contribution in the manner of the technology described herein is used in combination (in conjunction) with a corresponding determination for the diffuse lighting contribution in the frame region in the frame (image) being rendered. In an embodiment, the diffuse lighting contribution (and the effect of shadows on the diffuse lighting contribution) is determined in the manner described in the Applicant's earlier GB Patent Application GB-A-2525636.

Thus, in an embodiment, the method of the technology described herein further comprises (and the graphics processing system is further configured to), when rendering a frame for output that includes a light source that could cast shadows:

for at least one region of the frame being rendered:

determining a set of the geometry to be processed for the frame that could cast a shadow from a light source to be considered for the region of the frame being rendered; and for each sampling position of a set of sampling positions for the region of the frame being rendered, determining a diffuse light source visibility parameter using the determined set of geometry.

The region of a frame that is considered for the diffuse lighting determination can be any desired and suitable region of the frame, e.g., and in an embodiment, as discussed above in relation to the specular light determination.

In an embodiment, each frame region represents an appropriate portion (area) of the frame, in an embodiment comprising a plurality of sampling positions within the frame. In the case of the diffuse lighting determination, the frame is in an embodiment divided into plural frame regions that together encompass the entire frame (as diffuse lights effects would normally need to be considered for the entire frame being rendered). Thus the frame regions that are considered for the diffuse lighting determination in an embodiment each comprise an area of plural sampling positions within the frame, with those frame regions together comprising the entire frame.

In an embodiment, the frame regions that are considered for the diffuse and specular lighting are the same, and thus in an embodiment correspond to respective sets of contiguous, and in an embodiment rectangular, and in an embodiment square, sampling positions of the frame being rendered, such as, and in an embodiment, respective processing tiles of the frame being rendered.

Correspondingly, the set of sampling positions of a region of the frame being rendered that a diffuse light source visibility parameter is determined for can be any desired and suitable set of sampling positions, but in an embodiment comprises the set of sampling positions that will be processed for the frame region when producing (rendering) the (e.g., and in an embodiment final) output for the frame region, and/or in an embodiment corresponds to the set of sampling positions that a specular light source visibility parameter is being determined for.

In an embodiment for at least one, and in an embodiment for plural, sampling position of a set of sampling positions for the region of the frame being rendered, both a diffuse light source visibility parameter and a specular light source visibility parameter is determined. Because it is likely that not all of the sampling positions that are diffusely lit will also be specularly lit, there may be, and typically will be, some sampling positions for which only a diffuse light source visibility parameter is determined, but other sampling positions for which both a diffuse light source visibility parameter and a specular light source visibility parameter will be determined.

Again, in an embodiment only those frame regions that it is determined could be lit by a light source are subjected to the diffuse lighting processing.

The set of geometry for a frame region that could cast a shadow from a light source for the purposes of the diffuse lighting contribution can be, and is in an embodiment, determined in one of the manners discussed above for the specular light contribution, save that in the case of the diffuse lighting contribution, the entire area of a light source should be, and is in an embodiment, considered (i.e. there is no need to determine any smaller area of the light source for the purposes of the diffuse lighting determination (and in an embodiment that is accordingly not done)).

Accordingly, when determining the set of geometry to be processed for the frame that could cast a shadow for the diffuse lighting determination, that set of geometry is in an embodiment determined considering the whole light source (the entire area of the light source). Thus, where, for example, the set of geometry to be processed for the frame that could cast a shadow for the specular lighting determination is determined by considering the "specular" region of a light source alone, the set of geometry to be processed for the frame that could cast a shadow for the diffuse lighting determination will be determined using a larger light source area (namely the whole of the light source). Alternatively, as using the whole of the area to determine the set of geometry for the diffuse lighting determination will provide a superset of the geometry that could be required for the specular lighting determination, it would be possible simply to determine one set of geometry using the whole of the light source, and then use that determined set of geometry for both the diffuse and specular lighting determinations.

The diffuse light source visibility parameter that is determined for a sampling position in the frame region being considered from the determined set of geometry can be any desired and suitable parameter that can be used to provide the desired shadowing effect in the rendered output frame. It is in an embodiment a visibility parameter of the form discussed above in relation to the specular light source visibility parameter, such as, and in an embodiment, a value that can be (and that is to be) used to modulate the effect of the light source at the sampling position in question to provide (and to represent or simulate) the shadowing effect on the diffuse lighting contribution at that sampling position.

The diffuse light source visibility parameter for a sampling position can be determined as desired and in any suitable manner, but is in an embodiment determined in one of the manners discussed above for the specular light source visibility parameter (but using the set of geometry determined for the diffuse lighting determination).

Thus, in an embodiment, it is estimated how much light from the light source will fall upon the frame region sampling position in question, in an embodiment by testing whether, for each of one or more sampling positions representing the position of the light source, a ray cast between the frame region sampling position in question and the light source sampling position would intersect geometry in the determined set of geometry that could cast a shadow at the frame region sampling position in question (i.e. could be occluded by any geometry in the determined set of geometry that could cast a shadow in the frame region or not).

In this case, when determining a diffuse light source visibility parameter for sampling positions for a frame region for the diffuse lighting determination, that is in an embodiment done in respect of the entire area of the light source (as the entire light source can (potentially) contribute to the diffuse lighting in a frame region).

Thus, in an embodiment, for the determination of the diffuse light source visibility parameters for sampling positions for a frame region, an array of a given number of sampling positions covering the entire area of the light source being considered is used.

In an embodiment, a lower density (resolution) of sampling positions is used for representing the light source for the diffuse light source visibility parameter determination as compared to the density (resolution) of the light source representing sampling positions that are used for determining the specular light source visibility parameters for the sampling positions of a frame region.

In an embodiment, an array containing the same (or at least a similar) number of sampling positions across the relevant area of the light source is used for both the diffuse light source visibility parameter and the specular light source visibility parameter determination (i.e. such that a higher density of sampling positions would typically be used for the specular light source visibility parameter determination as compared to the diffuse light source visibility parameter determination, but both determinations will require the same overall number of sampling positions to be processed).

The determined diffuse light source visibility parameters for the frame region sampling positions are in an embodiment then used to simulate the (determined) effect of the shadows on the diffuse lighting in the rendered output frame region. This is in an embodiment done in one of the manners discussed above for the specular lighting. Thus, the determined light source visibility parameters are in an embodiment used to modulate the light source at the sampling positions when determining the output, rendered, colour to be used for the frame region (screen space) sampling positions.

In an embodiment, both a (appropriately modulated) diffuse lighting contribution from a light source and, if appropriate, a specular lighting contribution from the light source are determined for a given frame region sampling position, and then combined appropriately (e.g. summed or averaged) to provide the overall lighting contribution when determining the output, rendered colour to be used for the frame region sampling position.

Where a determination of both specular light source visibility parameters and diffuse light source visibility parameters, etc., is being performed, then in an embodiment, the two processes (the specular lighting process and the diffuse lighting process) share some of (at least some of) their processing operations, data structures, and/or processing results, etc., in an embodiment wherever possible.

For example, any determination of frame regions that will not be lit at all by a light source can be used in common for both the specular and diffuse lighting determinations. Equally, any frame region that is determined to be completely in shadow for the purposes of the diffuse lighting determination can be, and is in an embodiment, equally assumed to be completely in shadow for the specular lighting determination (and so, in an embodiment, no specular lighting determination is performed for such frame regions that are found to be completely in shadow for a diffuse lighting determination). Thus, in an embodiment, it is first determined for each frame region whether it is in shadow for the purposes of the diffuse lighting determination, and only those frame regions that are found not to be in shadow (to be other than in shadow) for the diffuse lighting determination are then subjected to the specular lighting determination of the technology described herein.

Correspondingly, any determination of data, such as sets of geometry, can be, and is in an embodiment, shared (reused) appropriately between the diffuse and specular lighting determinations.

Similarly, particularly in the case where the diffuse lighting determination is done first, any appropriate specular lighting determination processing that can be performed as part of that diffuse lighting determination pass can be, and is in an embodiment performed during the diffuse lighting determination processing.

In an embodiment, the specular lighting determination is performed in "real time" (as the frame is being rendered), because the specular lighting in the frame will be view position (camera position) dependent. Thus the specular lighting determination is in an embodiment done in lockstep with the rendering of the frame (at the time the frame is rendered). However, the diffuse lighting determination may be performed independently of any view determination, as that generally will not be view position dependent.

The frame(s) for output that is to be generated in the technology described herein can be any suitable and desired output frame that is to be generated by the graphics processing system. In an embodiment, it is an output frame for display (on a screen or via a printer, for example), but it could equally be any other form of output that a graphics processing system can be used to produce, such as a texture (e.g. in a render-to-texture process), or any other form of output data array.

The methods and apparatus of the technology described herein can be implemented in any appropriate and desired manner, e.g. in hardware or software (or both), and in (and be included in) any appropriate device or component.

It will be appreciated from the above, that embodiments of the technology described herein involve a number of processes that will be performed to generate the overall, final, output frame. For example, there may be a stage of building the frame regions, specular volumes, and/or subsets of primitives, etc., followed by testing of the frame regions, etc., to determine a set of geometry that could cast a shadow, with the determined geometry then being processed (used) in the desired manner.

These various processes may be carried out at different points in time and in different places in the overall graphics processing system, as and if desired.

For example, the process of building the frame regions, and/or subsets of primitives, etc., and the corresponding data structure(s) may be performed offline, in advance of the generation of the output frame in question, e.g. on a CPU (e.g. of the overall graphics processing system), or it could, e.g., be performed by the driver for the graphics processor that is to perform the graphics processing.

The process of using the information about the frame regions, and/or subsets of primitives, etc., to determine specular volumes, set(s) of geometry that could cast shadows, etc., is in an embodiment then performed at "run time", in an embodiment by the graphics processor (e.g. and in an embodiment, operating as a General Purpose GPU (GPGPU) (using GPGPU compute code on the graphics processor).

In an embodiment, this processing includes, where appropriate, determining whether any of the frame regions fall completely outside the light volume of influence (and culling any such frame regions).

The use of the determined set or sets of geometry that could cast shadows when generating an output frame is in an embodiment then carried out on the graphics processor itself.

Thus, in an embodiment, the apparatus of the technology described herein may comprise one or more or all of: a host processor, a CPU of a host processor, a driver for a graphics processor (GPU) that is to perform the graphics processing operation, and a graphics processor (GPU).

As will be appreciated from the above, the technology described herein is accordingly in an embodiment implemented and executed in a graphics processing system that includes a host processor (CPU) and a graphics processor (GPU), with the host processor executing a driver for the graphics processor, with the GPU, e.g., using the data representing the frame regions, specular volumes, geometry, etc., to determine a set or sets of geometry that could cast shadows, and in an embodiment then using the so-identified set(s) of geometry in the desired manner.

The graphics processor and/or graphics processing system may also comprise, and/or be in communication with, one or more memories and/or memory devices that store the data described herein, and/or the output data generated by the graphics processing unit, and/or store software for performing the processes described herein. The graphics processing unit may also be in communication with the host microprocessor, and/or with a display for displaying images based on the data generated by the graphics processing unit.

The technology described herein can be used in any suitable and desired graphics processing system.

The technology described herein is particularly suitable for use with tiled renderers (graphics processing systems). It is particularly suitable for tiled deferred renderers, but could also be used with other tiled methods, such as "tiled forward rendering", if desired. Thus, in an embodiment, the graphics processing system is a tiled renderer, in an embodiment a tiled deferred renderer.

It would also be possible to use the technology described herein in non-tiled renderers, e.g., and in an embodiment, by determining the light source visibility parameters for frame regions and storing them in visibility buffers, and then performing the final rendering (using the stored light source visibility parameters) in a separate rendering pass.

The graphics processing system is in an embodiment able to be operated both in a conventional graphics context, e.g. to perform conventional graphics rendering processes, and also in a compute context so as to be able to perform GPGPU processing.

The graphics processor may contain any suitable and desired processing stages (elements) that a graphics processor and processing pipeline may contain such as a rasteriser, a renderer (a fragment shader), an early depth (or an early depth and stencil) tester, a late depth (or depth and stencil) tester, a blender, a tile buffer or buffers, a write-out unit, etc.

The graphics processing system in an embodiment includes at least local memory, such as (on-chip) buffer or buffers, and/or register(s), that can be used to store the data required, e.g. for the light source visibility parameter determination process and the determined light source visibility parameters. Where present, the tile buffers can be used for this purpose, if desired.

The technology described herein can be used for all forms of output that a graphics processing system may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and stages of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/ or in the form of programmable processing circuitry that can be programmed to perform the desired operation. Equally, any one or more of the processing stages and processing stage circuitry of the technology described herein may comprise a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that in embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in an embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows a typical computer graphics processing system, comprising a host processor (CPU) 1, a graphics processing unit (GPU) 3, and a memory 5 for storing data required by and/or generated by the host processor 1 and GPU 3.

When an application 2 that is executing on the host processor 1 requires graphics processing from the GPU 3, such as a frame to be displayed, the application 2 will send appropriate commands and data to a driver 4 for the GPU 3 that is running on the host processor 1.

The driver 4 will then send appropriate commands to the graphics processor 3 to cause it to generate the graphics output required by the application 2.

The commands and data provided to the driver 4 will (typically) indicate a list of primitives to be rendered for the output frame to be generated by the graphics processor 3, together with an associated vertex array that includes the vertices to be used for the primitives for the output frame.

The output frame to be generated by the graphics processor 3 may typically be a frame intended for display on a display device, such as a screen or printer, but may also, for example, comprise intermediate data intended for use in later rendering passes (also known as a "render to texture" output), etc.

The primitives to be processed for the output frame are usually listed in the order that they are to be rendered. Each primitive will have associated with it a set of vertices which are referred to by their index in the associated vertex array.

To further facilitate the rendering operation, the primitives to be processed for an output frame will usually be organised into distinct draw calls. For each draw call there will be a set of primitives to be processed, with each primitive in the set having associated with it a set of vertices which are referred to by their indices in the associated vertex array. The draw calls for an output frame are processed in turn to generate the output frame.

Figure 2:
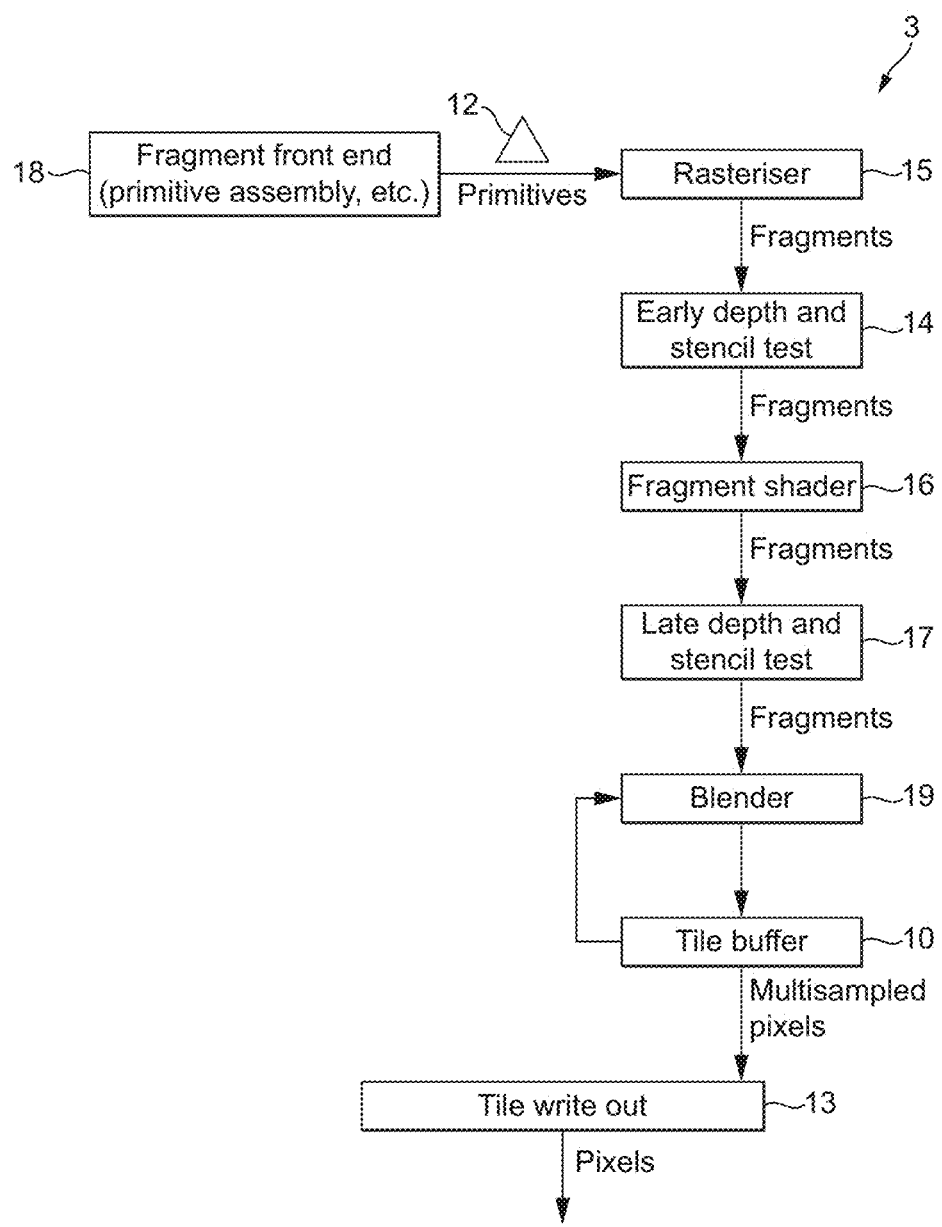
FIG. 2 shows schematically an exemplary graphics processing pipeline.

FIG. 2 shows schematically the graphics processor (graphics processing pipeline) 3 in more detail. In the present embodiment the graphics processing pipeline 3 is a tiled deferred renderer with a fully programmable GPGPU context, for example a renderer which executes partly via Direct Compute, OpenCL, CUDA, etc.

As the graphics processing pipeline 3 shown in FIG. 2 is a tile-based renderer, it will produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space sampling positions.)

Figure 3:
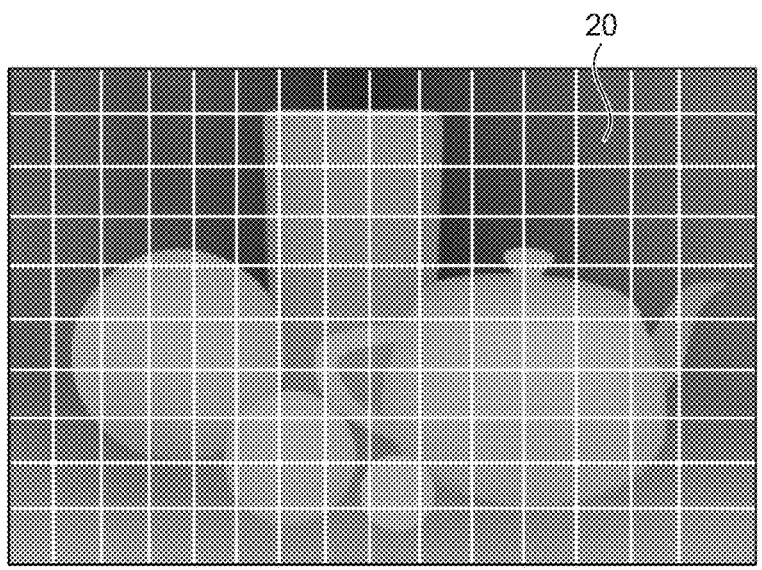
FIG. 3 shows an exemplary image to be displayed that has been divided into tiles for processing purposes.

FIG. 3 shows an exemplary render output data array in the form of an image to be displayed that has been divided into respective tiles 20.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate processing circuitry and/or processing logic, etc., for performing the necessary operation and functions.

FIG. 2 shows schematically the pipeline stages after the graphics primitives (polygons) 12 for input to the rasterisation process have been generated. Thus, at this point the graphics data (the vertex data) has undergone fragment frontend operations 18, such as transformation and lighting operations (not shown), and a primitive set-up stage (not shown) to set-up the primitives to be rendered, in response to the commands and vertex data provided to the graphics processor.

As shown in FIG. 2, this part of the graphics processing pipeline 3 includes a number of processing units (stages), including a rasteriser 15, an early Z (depth) and stencil tester 14, a renderer in the form of a fragment shader 16, a late Z (depth) and stencil tester 17, a blender 19, a tile buffer 10 and a downsampling and writeout (multisample resolve) unit 13.

The rasteriser 15 of the graphics processing pipeline 3 operates to rasterise the primitives making up the render output (e.g. the image to be displayed) into individual graphics fragments for processing. To do this, the rasteriser 15 receives graphics primitives 12 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil tester 14 performs a Z (depth) test on fragments it receives from the rasteriser 15, to see if any fragments can be discarded (culled) at this stage. To do this, it compares the depth values of (associated with) fragments issuing from the rasteriser 15 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil tester 14 are then sent to the fragment shader (renderer) 16. The fragment shader 16 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil tester 17, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shader 16 with the depth values of fragments that have already been rendered (as stored in the depth buffer). This late fragment depth and stencil tester 17 also carries out any necessary "late" alpha and/or stencil tests on the fragments.

The fragments that pass the late fragment test 17 are then subjected to, if required, any necessary blending operations with fragments already stored in the tile buffer 10 in the blender 19. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer stores colour and depth buffers that store appropriate colour, etc., values or a Z-value, respectively, for each sampling position that the buffers represent (in essence for each sampling position of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 that allow the effect of shadows in an image being rendered to be simulated in accordance with embodiments of the technology described herein will now be described.

The present embodiments will be described, for ease of explanation, with reference to processing a frame composed of solid geometry and a single, rectangular, area light source. However, other arrangements would, of course, be possible.

The present embodiments operate to simulate the effect of shadows in specular lighting in an image being rendered by determining, for each tile of the output frame, a set of geometry that could cast a specular-lighting affecting shadow from a light source on objects in the tile, and then using that determined set of "shadow-casting" geometry to derive a specular light source visibility parameter for each sampling position of the tile in question. The specular light source visibility parameters for the sampling positions for the tile are then used when rendering (shading) the output image for the tile to modulate the colour values for the sampling positions so as to simulate the effect of the shadows on the specular lighting at the sampling positions.

Figure 17:
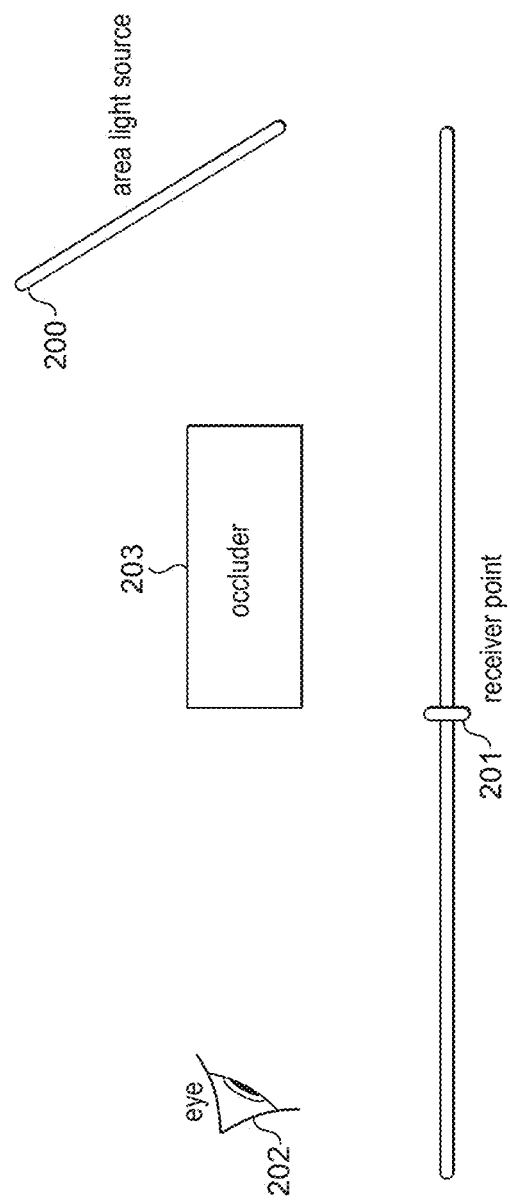
FIGS. 17, 18 and 19 illustrate the determination of the effect of shadows on specular lighting at a sampling position in an embodiment of the technology described herein.
Figure 18:
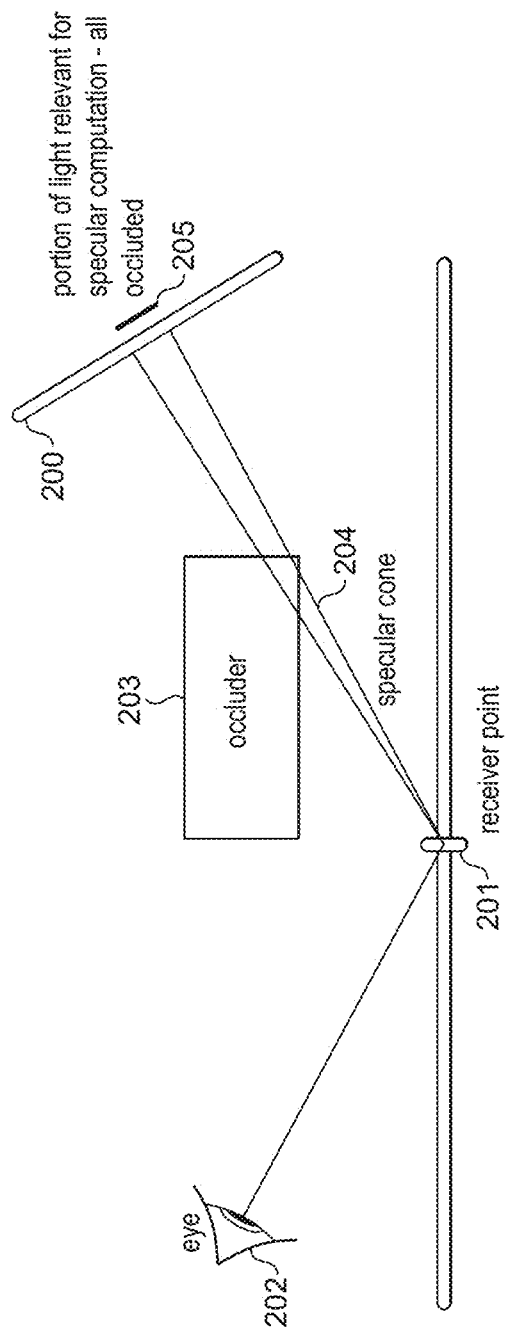
Figure 19:
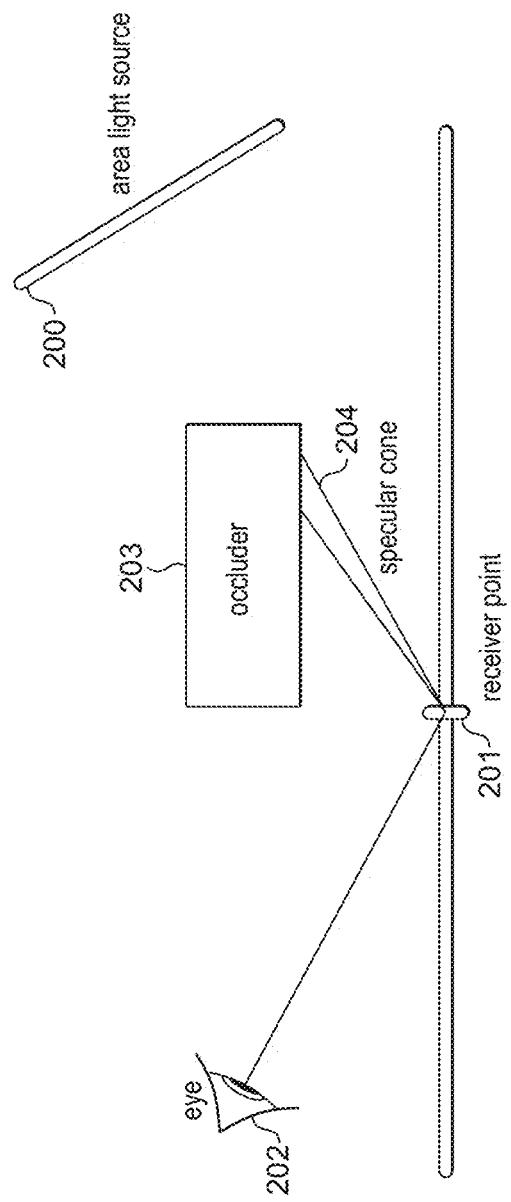

FIGS. 17, 18 and 19 show schematically the principle of this operation in the present embodiments.

FIG. 17 shows an exemplary lighting situation for a frame being rendered, in which the specular lighting effect of an area light source 200 at a sampling position 201 for a view position 202 in the presence of potentially occluding geometry 203 is to be considered.

To assess the specular lighting contribution from the area light source 200 at the sampling point 201 in the presence of the potentially occluding geometry 203, the relevant specular volume 204 (in the present embodiments in the form of a specular cone) for the sampling position 201 given the view position 202 is determined (see FIG. 18). The portion (region) 205 of the light source 200 that is intersected by the specular cone 204 for the sampling position 201 is then determined so as to identify the portion (region) 205 of the light source 201 that will be relevant for the specular lighting determination at the sampling position 201.

Figure 21:
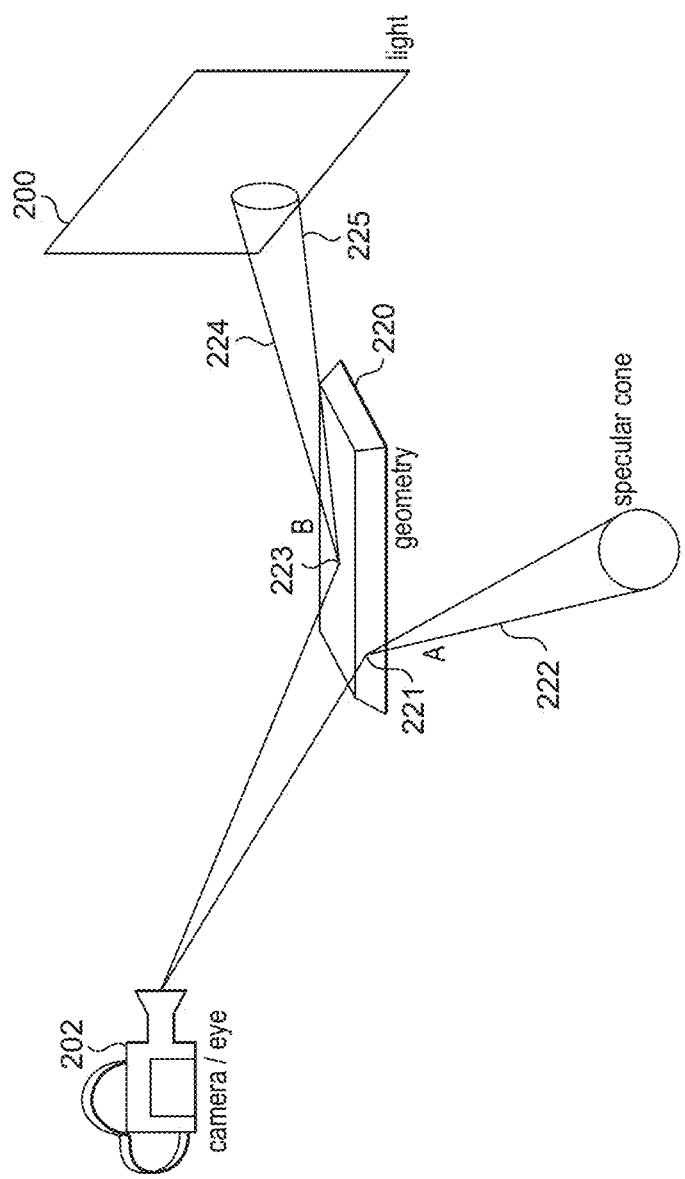
FIG. 21 shows exemplary specular volumes for sampling positions.

FIG. 21 shows further examples of specular volumes for respective sampling positions and the corresponding region of a light source that is intersected by a specular volume for a sampling position.

In the example shown in FIG. 21, for a view position 202, the specular volume 222 for a first sampling position 221 on a "sideways" facing surface of geometry 220 will not intersect the light source 220 at all. In this case, there will accordingly be no specular lighting contribution at the sampling position 221.

On the other hand, the specular volume 224 for a second sampling position 223 on a different face of the geometry 220 intersects a portion (region) 225 of the light source 200 (and so there will be a specular lighting contribution at that sampling position).

It is then determined whether any of the light from the determined specular region 205 of the light source 200 is occluded by the potentially occluding geometry 203.

As shown in FIG. 19, in the example shown in FIGS. 17 and 18 the occluding geometry 203 will in fact occlude all of the determined specular region 205 of the light source 200 from the sampling position 201, so it can be determined that there is no specular lighting contribution at the sampling position 201 in this example. (On the other hand, if the specular cone 204 was not occluded by the occluding geometry 203, then there would some portion of the specular region 205 for the light source 200 that could illuminate the sampling position 201, and so there would be a specular contribution from the light source 200 at the sampling position 201.)

As will be discussed further below, the present embodiments allow the specular contribution at sampling positions in a frame being rendered from light sources for the frame to be determined in a relatively straightforward and efficient manner, whilst taking account of the effect of shadows caused by (potentially) occluding geometry.

Figure 4:
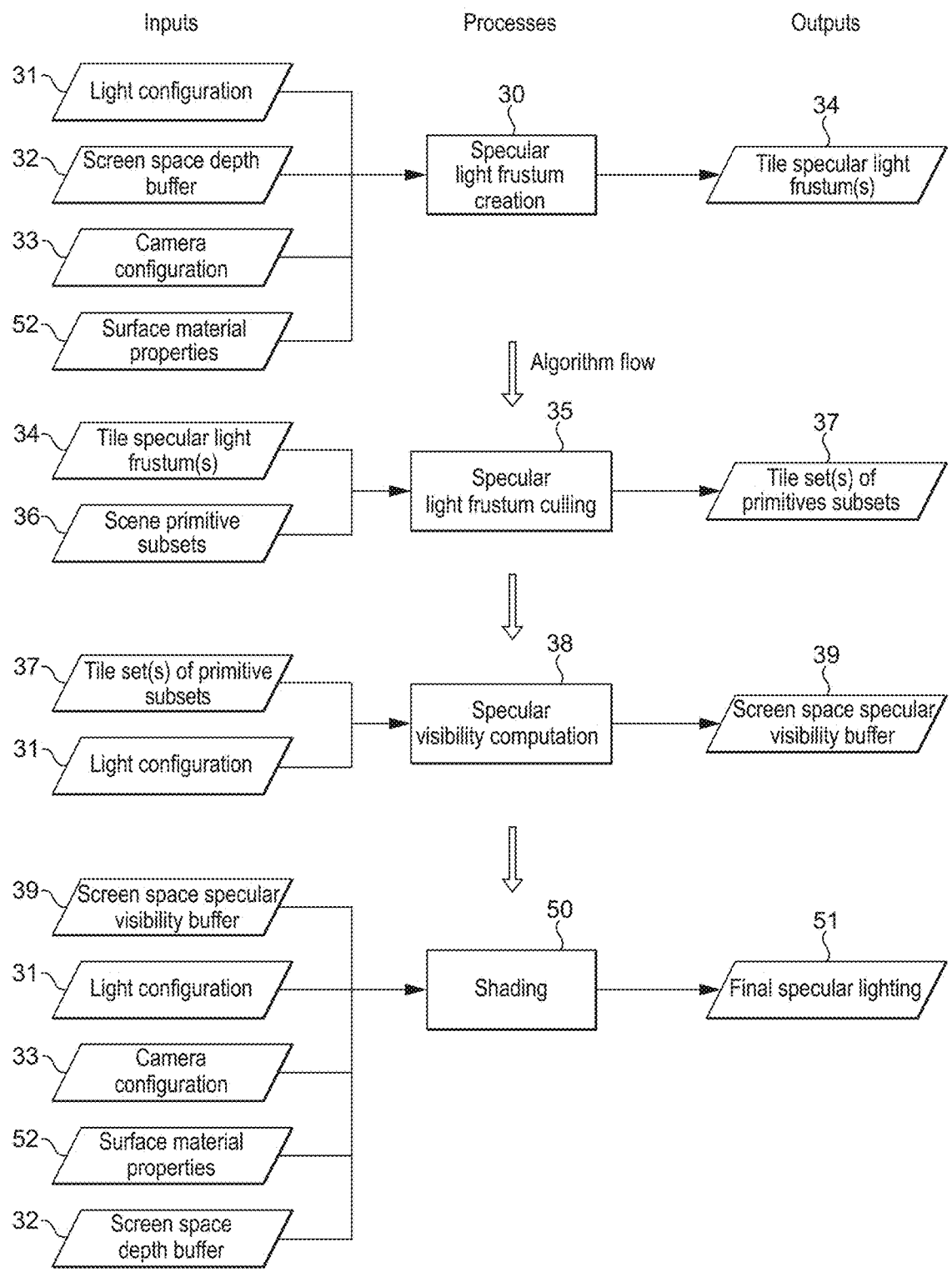
FIG. 4 shows schematically the processing of a tile being rendered in an embodiment of the technology described herein.

FIG. 4 shows schematically this operation for a given tile of a frame being rendered in more detail.

As shown in FIG. 4, the process starts by determining specular light source bounding frustrums for the light or for each light that could shine in the tile in question (step 30).

To do this, first a specular volume in the form of a specular cone is determined for the tile. In the present embodiment, this is done by determining specular cones for each sampling position of the tile, and then determining the specular volume for the tile as the super set of the individual sampling position's specular volumes. Other arrangements would, of course, be possible.

The specular volume for a given sampling position is determined in the present embodiment using the camera configuration (view position) 33 for the frame being rendered, the position of the sampling position, any specular lighting affecting material properties 52 defined for the sampling position, and the normal direction for the sampling position.

Once the specular volume for the tile has been determined, then that specular volume is intersected against the area of a light source being considered (using the light configuration 31), to identify the region (portion) of the light source that will be relevant to the specular lighting (that could cause specular lighting) in the tile.

This process is repeated for each light source that could potentially light the tile in question.

Once the "specular lighting" region of the (or each) light source has been determined, then as shown in FIG. 4, specular light source bounding frustrums are created for the light or for each light that could shine in the tile in question (step 30).

This operation takes as its inputs information 31 about the configuration of the light or lights for the frame being rendered, the determined "specular lighting" regions for the (or each) light source, a screen space depth buffer 32 that has previously been derived from the geometry for the frame, and information indicating the camera configuration 33 for the frame, and produces as its output, one or more specular light source bounding frustums 34 for the tile.

In the present embodiment, one bounding frustum is produced for a tile for each light source, although other arrangements, such as producing plural bounding frustums for a given light source, would be possible, if desired. It may, for example, be desirable to produce plural bounding frustums for a given light source if, for example, there are large depth discontinuities in the frame, and/or when the screen space samples for the frame can be split into disjoint groups which are themselves local, but far apart from each other.

Figure 5:
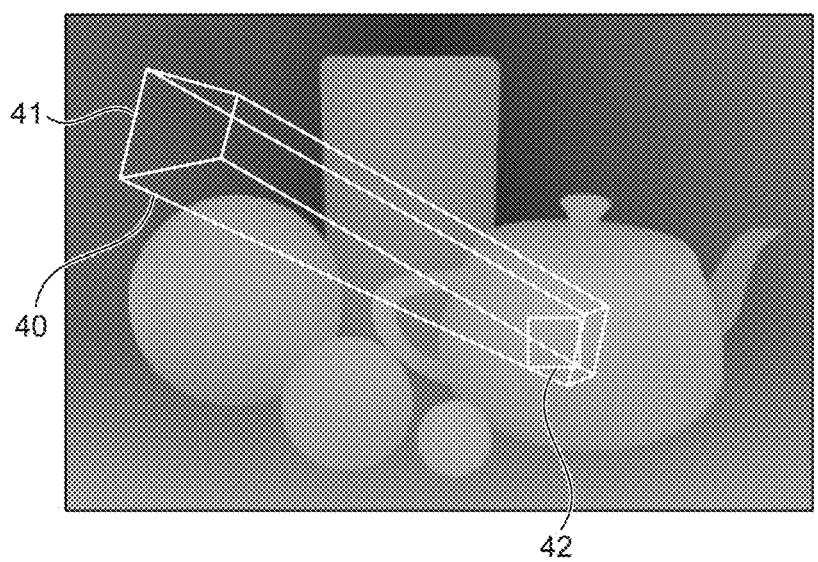
FIG. 5 shows an exemplary light source bounding frustum for a tile.

To determine a specular light source bounding frustum for a tile, the minimum and maximum depth values for the tile are determined from using the data in the screen space depth buffer 32. This is then used to construct a bounding frustum which contains all of the visible geometry in the tile and the determined "specular region" of the light source. FIG. 5 illustrates this and shows an exemplary light source bounding frustum 40 for a specular region 41 of an area light for a given tile 42 of the frame.

Once all the specular light source bounding frustums have been derived for the tile being processed, those specular light source bounding frustums are then used, as shown in FIG. 4, to determine a set of geometry for the tile that could cast a shadow in the specular lighting for the tile (step 35).

In the present embodiment the set of geometry for a tile that could cast a shadow in the tile is determined as a set of subsets of primitives of the set of primitives that is to be processed for the frame (or draw call) in question. In effect, the set of primitives to be processed for the frame or draw call in question is divided into plural subsets of primitives, and it is then determined which of those subsets of primitives could cast a shadow in a tile (and in each tile). The process of dividing the set of primitives into subsets of primitives and the data that is prepared and stored for the respective subsets of primitives that is then used in the operation of the present embodiment will be described in more detail below.

To determine a set of subsets of primitives that could cast a shadow in the specular lighting for a tile, as shown in FIG. 4, the scene (frame) geometry 36 in the form of subsets of primitives is culled against the specular light source bounding frustum(s) 34 for the tile in a light frustum culling process 35. This process operates to construct a list of possible occluding subsets of primitives which could affect the specular lighting of the tile (cast a shadow in the tile), by determining, for each subset of primitives, whether or not it intersects a specular light source bounding frustum for the tile. (This is on the basis that any occluding subset of primitives which could affect the specular lighting of geometry in the tile must intersect a specular light source bounding frustum for the tile.)

The output of this process is accordingly a list 37 of subsets of primitives for the tile which could cast a shadow in the specular lighting in the tile.

The specular light source bounding frustum culling operation 35 can be carried out as desired. For example, it would be possible to iteratively test each subset of primitives in turn against each light source bounding frustum. However, in the present embodiments, this operation is accelerated by using a hierarchy for the tile light source bounding frustums and a separate hierarchy for the subsets of primitives. In this case, high level, bounding volume, representations of the subsets of primitives are first tested against light source bounding frustums for sets of plural tiles, and then any high level bounding volume representations of subsets of primitives that pass this first stage are intersection tested against the individual tile light source bounding frustums. Finally, individual subsets of primitives are tested against the individual tile light source bounding frustums.

Once the lists (sets) of subsets of primitives 37 that could affect the specular lighting of the tile have been determined, those sets of subsets of primitives are then used to determine a specular light source visibility parameter for each sampling position in the tile in question in a specular visibility computation process 38, as shown in FIG. 4. This specular visibility computation operation 38 operates to determine a specular light source visibility parameter for each sampling position of the tile (which specular light source visibility parameter is then used to modulate the specular lighting from the light source to simulate the effect of the shadows at the sampling position in question).

To do this, an array of sampling positions representing the determined "specular region" of the light source being considered is determined, and it is then determined for each tile screen space sampling position, whether rays cast between the tile sampling position and each light source sampling position would intersect an occluding subset of primitives or not.

Figure 6:
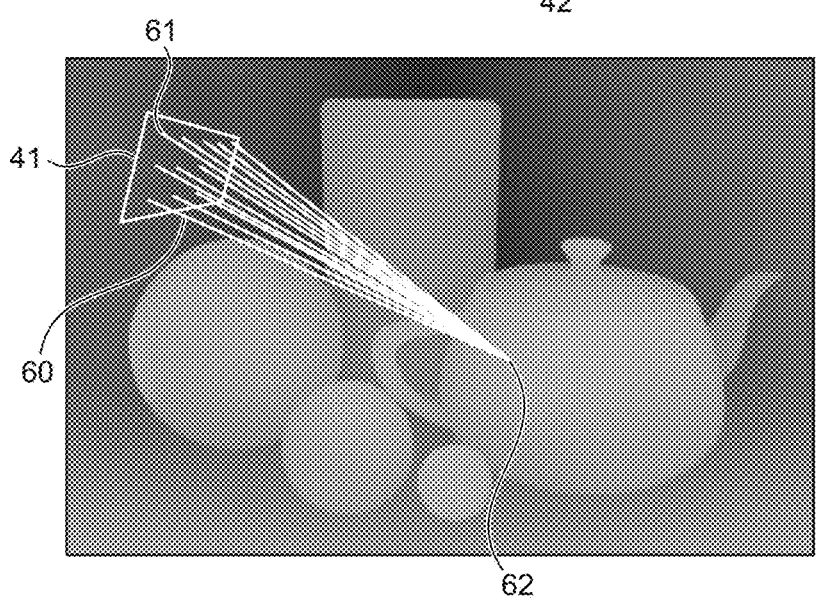
FIGS. 6, 7, and 8 illustrate the determination of occluded light source sampling positions in an embodiment of the technology described herein.
Figure 7:
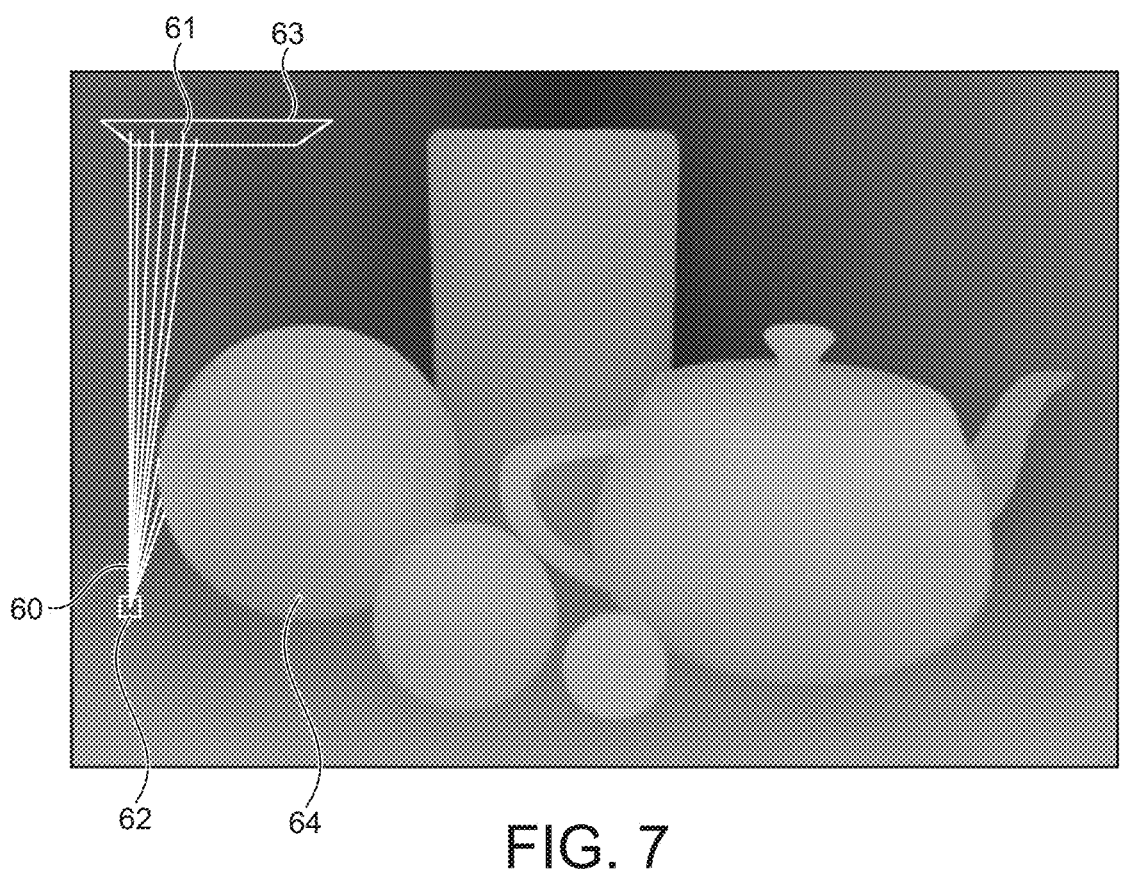
Figure 8:
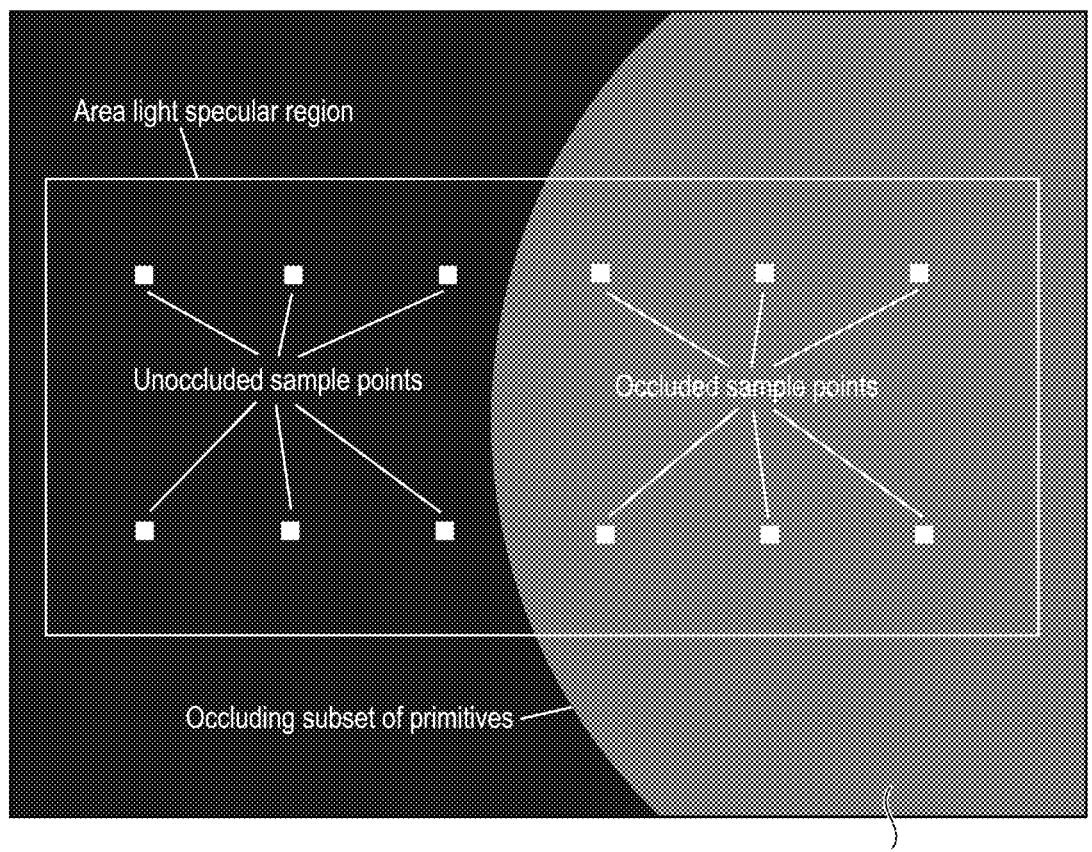

FIGS. 6, 7 and 8 illustrate this operation. FIG. 6 shows exemplary rays 60 cast from sampling positions 61 for a specular region 41 of an area light to a tile sampling position 62. In this example shown in FIG. 6, it is assumed that none of the rays from the tile sampling position 62 to the light source sampling positions 61 intersect an occluding subset of primitives.

FIG. 7 shows an alternative situation in which some of the rays 60 cast from the tile sampling position 62 being considered to sampling positions 61 representing a specular region 63 of an area light will be intersected by an occluding subset of primitives 64 (representing a sphere for example).

As shown in FIG. 8, in this case, some of the sampling points representing the specular region 63 of the area light will be occluded from the perspective of the tile sampling position 62 by the occluding subset of primitives 64 and others of those sampling points will not be occluded.

In the present embodiments, the determination of whether rays cast between a tile sampling position and each light source sampling position would intersect an occluding subset of primitives is carried out as a rasterisation operation. To do this, a single execution thread is used for each tile sampling position, and operates to rasterise the subsets of primitives as indicated by the determined sets of subsets of primitives 37 for the tile onto a render target that corresponds to the array of sampling positions that represent the determined specular region of the light source. As for each sampling position in the tile the same set of subsets of primitives will be considered, the memory access and thread execution pattern for this operation can be extremely coherent.

In the present embodiment, this rasterisation operation (the visibility computation process 38) operates to identify for each light source sampling position whether it is occluded from the tile sampling position in question by any subsets of primitives or not. Thus the render target for the rasterisation process is an array having a single bit for each light source sampling position, with the bit being set by the rasterisation operation if it is determined that the light source sampling position in question will be visible from the tile sampling position being considered.

In this arrangement, where, for example, the light source is represented by, e.g., a few hundred sampling positions, the "light source visibility" render target will only require a few hundreds of bits (one per sampling position), and so can, for example, fit in registers (i.e. does not need to be stored in main memory).

Once all the relevant subsets of primitives have been considered by the rasterisation process, the number of set bits in the render target is then counted (i.e. the number of visible light source sampling positions for the tile sampling position in question is counted), and used to determine a specular light source visibility parameter value for the tile (screen space) sampling position in question. In the present embodiment, the specular light source visibility parameter value for the tile (screen space) sampling position is determined as the ratio of visible (non-occluded) light source sampling positions for the tile sampling position in question to the total number of light source sampling positions for the light source specular region in question. Other arrangements would of course be possible.

This value is then stored for the tile sampling position in question in a screen space visibility buffer 39 that will store the determined specular light source visibility parameters for each sampling position of the tile. The process is then repeated for the next sampling position in the tile, and so on, until a specular light source visibility parameter has been determined and stored in the screen space visibility buffer 39 for each sampling position of the tile.

The screen space visibility buffer 39 for the tile is stored locally to the graphics processing pipeline, e.g. in registers (and does not need to be and is not written out to main memory).

In these arrangements, the specular light source visibility parameter for a tile sampling position could simply be the proportion (ratio) of the number of light source sampling positions that are visible at the sampling position in question, or, for example, the proportion of visible light source sampling positions could be scaled to a number that is within a predefined range, such as between 0 and 1, which scaled value is then used as the specular light source visibility parameter value for the tile sampling position in question.

The array of sampling positions that represent the determined specular region of the light source being considered in these embodiments can be selected as desired. For example, a regular grid of sampling positions could be used, and a rotated grid of sampling positions could be used to try to reduce aliasing. In an embodiment a relatively high density of sampling positions is used to account for the likely higher frequency variations that could be present in the specular lighting contributions.

Once the screen space visibility buffer 39 for a tile has been determined, the values in the screen space visibility buffer can then be used when shading the geometry in the tile to determine the specular lighting contribution in the rendered output image for the tile, as shown in FIG. 4 (step 50).

As shown in FIG. 4, the shading operation 50 will determine an output specular light contribution 51 for each tile sampling position that is being used to display the output image. This shading operation will, inter alia, take into account the intensity and colour of the light source, the colour and transparency and the material properties of the surface that the light is falling on, the depth of the surface that the light is falling on, the view position and direction (camera parameters), and, in accordance with the present embodiments, the determined specular light source visibility parameters, to determine an output colour for each tile sampling position.

To do this, the shading operation 50 uses, inter alia, the light configuration 31 for the frame, the view position (camera configuration) 33 for the frame, the relevant surface material properties 52 at the sampling position in question, the depth 32 at the sampling position in question, and the specular light source visibility parameter in the screen space visibility buffer 39 for the tile sampling position being considered.

The specular light source visibility parameter from the screen space visibility buffer 39 is used in the shading operation 50 in the present embodiments to modulate (attenuate) the indicated specular illumination value for the light source in question at the (and at each) tile sampling position being considered, by multiplying the specular illumination value for the specular light source by the specular light source visibility parameter for the tile sampling position being considered. In the present embodiments, the specular illumination value for a light source at a sampling position that is modulated using the determined specular light source visibility parameter for the sampling position comprises the unoccluded specular lighting contribution from the light source at the sampling position being considered.

This will then give a good, visually pleasing approximation to the correct shadowing result.

Other arrangements would, of course, be possible.

In the present embodiments, each of the processing stages shown in FIG. 4 (thus the specular volume determination, the light source specular region determination, the light frustum creation 30, the light frustum culling 35, the visibility computation 38 and the shading 50) are performed by the graphics processor 3 performing GPGPU processing via a compute context.

The above describes the operation for a single output tile for a single light source. The operation can be extended in a corresponding manner to arbitrarily many light sources for a tile.

It will also be appreciated that this operation should be repeated for each tile of the frame being rendered for output (at least where there could be shadow-casting geometry) (and for each frame of a sequence of frames to be rendered).

As discussed above, in the present embodiments the geometry for a frame to be processed that is tested to determine if it will occlude a light source for a given frame region (and that is then tested against the respective light source representing sampling positions) is represented for this purpose as respective subsets of primitives of the set of primitives that is to be processed. The process for dividing a set of primitives to be processed into subsets of primitives that is used in the present embodiments will now be described with reference to FIGS. 9, 10, and 11.

In the present embodiments, it is assumed that the primitives in the set of primitives to be processed are in the form of triangles. Thus this operation of the present embodiments will be described with reference to primitives in the form of triangles. However, this is not essential, and primitives having other forms could be used if desired (with the process then operating in a corresponding manner for those primitives).

Figure 9:
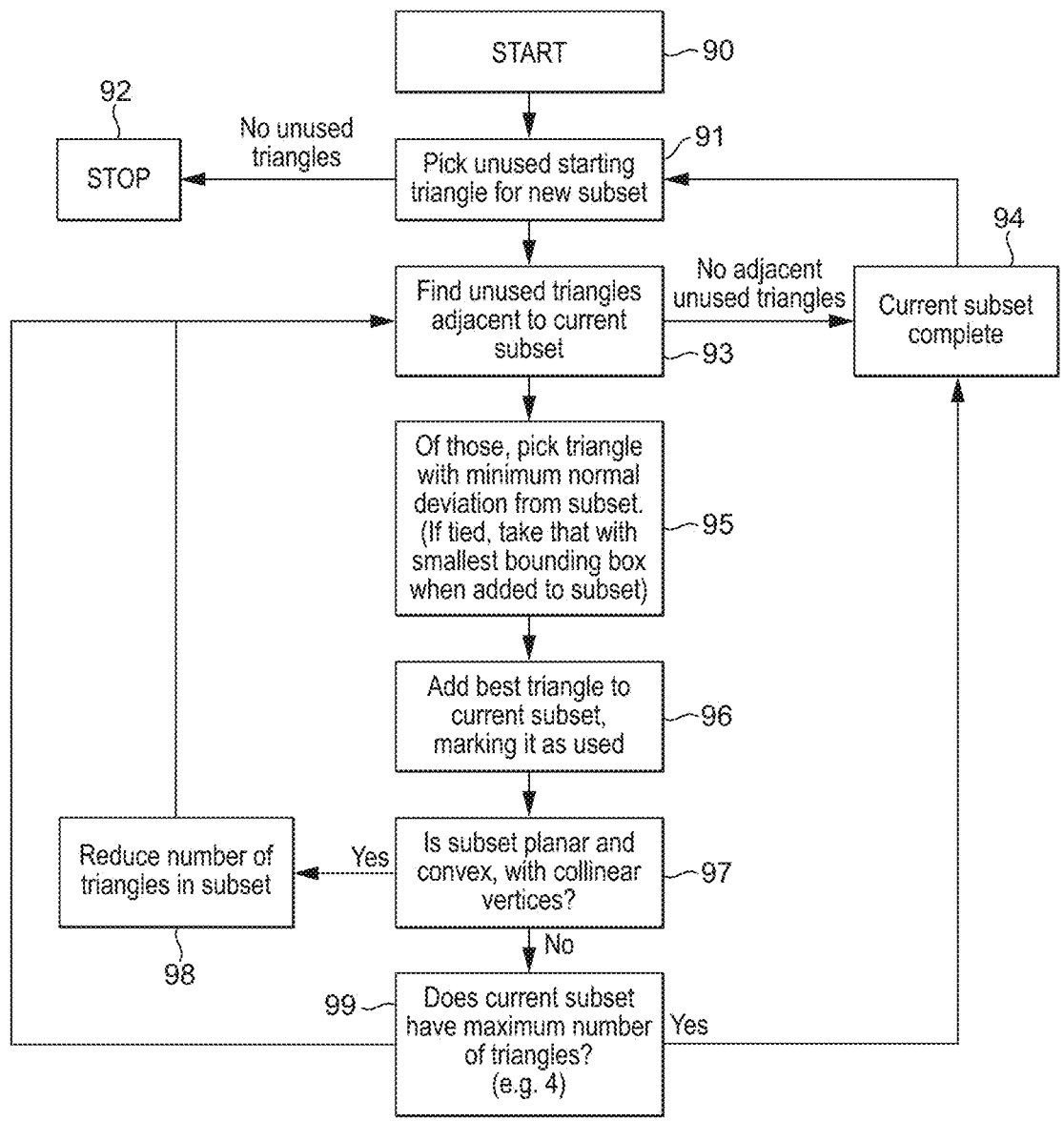
FIG. 9 shows schematically the subdivision of a set of primitives into subsets of primitives in an embodiment of the technology described herein.

As shown in FIG. 9, the processing starts (step 90) by selecting an unused starting triangle of the set of primitives being considered (i.e. a primitive in the set of primitives being processed that has not yet been allocated to a subset) to act as a starting triangle for a new subset of primitives (step 91).

The set of primitives that is being considered in this regard may, e.g., be the set of primitives to be processed for the desired graphics processing output (e.g. output frame) as a whole, or it may be a set of primitives defined for a smaller subdivision of the graphics processing output, such as a set of primitives for a given draw call.

If at step 91 it is determined that there are no remaining unused (unallocated) primitives in the subset of primitives (i.e. that all the primitives of the subset of primitives being considered have been allocated to a respective subset of primitives), then the process of subdividing the set of primitives into subsets of primitives is complete (step 92).

On the other hand, if at step 91, there is an unused triangle (primitive) in the set of primitives, then that unused triangle is selected as a starting triangle for a new subset of primitives. It is then determined whether there are any unused triangles (i.e. any primitives in the set of primitives that have not yet been allocated to a subset of primitives) that are adjacent to and contiguous with the current subset of primitives (step 93).

If at this stage it is determined that there are no adjacent, contiguous, unused triangles in the set of primitives, then the current subset of primitives is considered to be complete (step 94), and the process returns to the selection of a new, unused starting primitive for a new subset of primitives at step 91.

On the other hand, if there are unused, contiguous triangles adjacent to the subset of primitives currently being considered, then one of those adjacent, contiguous triangles is selected as a triangle (primitive) to add to the current subset of primitives (step 95).

As shown in FIG. 9, if there is more than one unused, adjacent, contiguous triangle to the current subset, then firstly the candidate adjacent contiguous triangle to add to the subset of primitives that has the minimum normal deviation from the subset of primitives (in its current form) is selected as the triangle to add to the subset of primitives. If the candidate adjacent, contiguous triangles cannot be distinguished on the basis of their normal deviation from the subset of primitives, then the candidate adjacent, contiguous triangle that adds the smallest bounding box when added to the current subset of primitives is selected as the primitive to add to the subset of primitives.

The normal directions of the triangles and subset of primitives, and the bounding volumes for the subset of primitives and the candidate primitives can be determined for this purpose in any suitable and desired manner, for example based on the vertices for the primitives (triangles).

The selected candidate unused adjacent and contiguous triangle is then added to the current subset of primitives (and marked as being used (allocated to a subset of primitives)) (step 96).

Once a candidate triangle has been added to a subset of primitives at step 96, it is then determined whether the subset of primitives with that new triangle is planar and convex, with co-linear vertices (step 97). If so, the number of triangles in the subset is reduced, by merging the planar triangles with co-linear vertices to form a single primitive to remove their shared edge (step 98).

The process then returns to step 93 to determine if there are any further unused, adjacent and contiguous triangles that could be added to the current subset of primitives.

If at step 97 it is determined that the subset is not planar and convex with co-linear vertices, then triangles in the subset of primitives cannot be merged, so the process proceeds then to determine whether the current set of primitives has reached a selected maximum number of triangles or not (which in the present embodiment is set to be four triangles, although other arrangements would, of course, be possible) (step 99).

If it is determined that the current subset of primitives has not yet reached the maximum number of triangles permitted for a subset of primitives, then the process returns to step 93 to determine if there are any further unused, adjacent and contiguous triangles that could be added to the current subset of primitives.

On the other hand, if it is determined that the current subset of primitives has reached the maximum number of triangles permitted for a subset of primitives at step 99, then the current subset of primitives is considered to be complete (step 94) and the process returns to step 91 to determine a new starting triangle for a new subset of primitives (if any).

This process is repeated until all the primitives (triangles) in the set of primitives being considered have been allocated to a subset of primitives.

Figure 10:
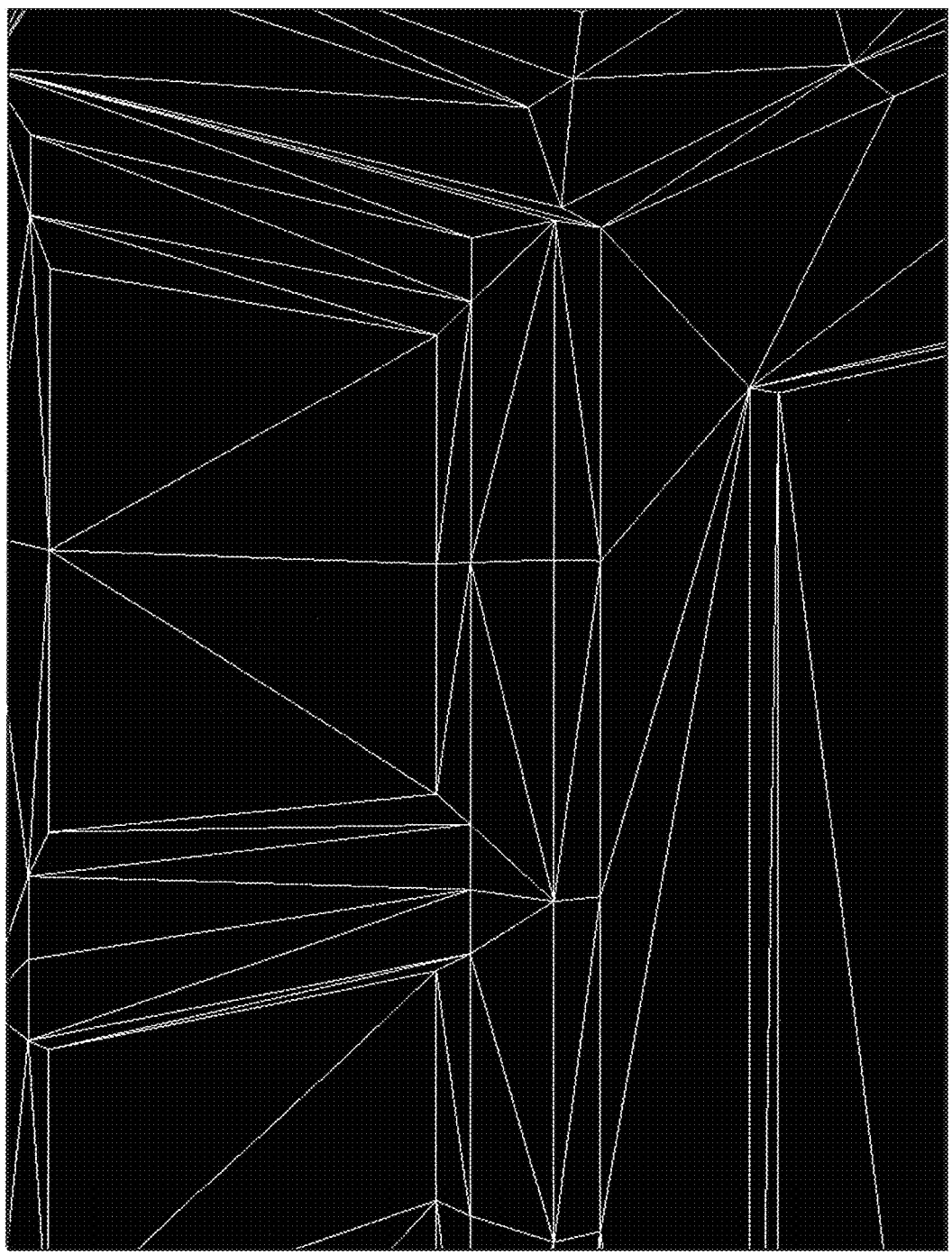
FIGS. 10 and 11 illustrate the subdivision of a set of primitives into subsets of primitives.
Figure 11:
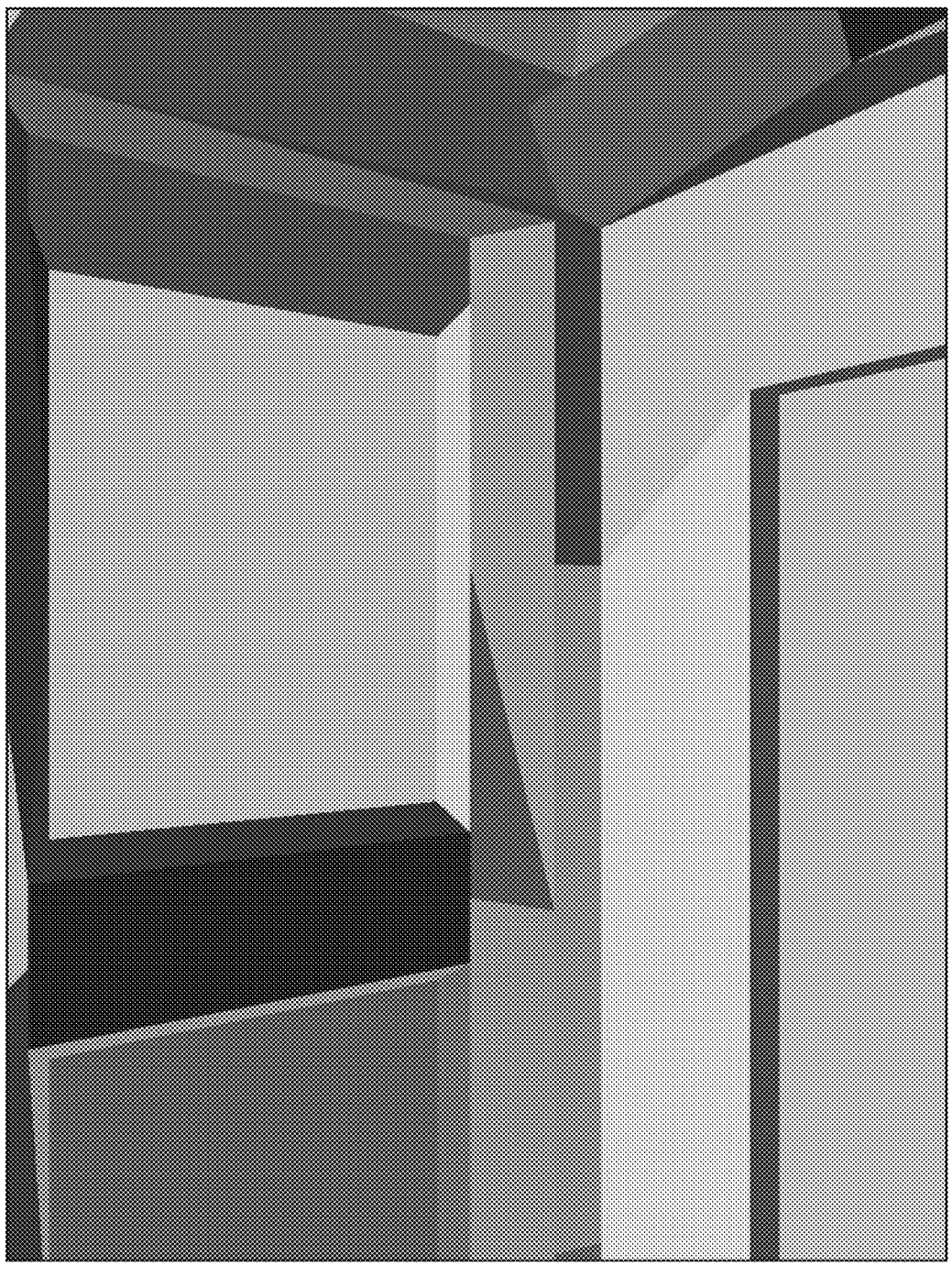

FIGS. 10 and 11 illustrate this subdivision of a set of primitives into subsets of primitives.

FIG. 10 shows an exemplary set of primitives to be subdivided into subsets of primitives in the manner of the present embodiment. FIG. 11 shows schematically the resulting subsets of primitives that are formed from the set of primitives shown in FIG. 10. Each different coloured region in FIG. 11 is a respective subset of primitives formed from the set of primitives shown in FIG. 10 in accordance with the process for dividing a set of primitives into subsets of primitives shown in FIG. 9.

Other arrangements for subdividing a set of primitives into subsets of primitives would, of course, be possible.

As well as subdividing the set of primitives to be processed into respective subsets of primitives, the present embodiments also store for each subset of primitives that the set of primitives has been divided into, data representative of the primitives of the subset of primitives, and data indicating the volume of space that the subset of primitives falls within.

In the present embodiments, this data is stored in a fixed sized data structure for each subset of primitives, as that facilitates, e.g., accessing that data in memory. Where the data for a given subset of primitives does not completely fill the fixed size data structure (e.g. because the subset contains less than the maximum permitted number of primitives), the data structure is in an embodiment padded with dummy values or includes data values to indicate this.

In the present embodiments, the data representative of the primitives in a subset of primitives that is stored for a subset of primitives comprises a set of vertex indices that indicate a vertex index for each unique vertex position of the subset of indices. To facilitate this, a modified set (list) of vertices that includes only unique vertex positions is generated from the set of vertices for the set of primitives in question. The index data that is then stored for each subset of primitives indicates the vertices (the vertex positions) in that modified set (list) of vertices. The vertex indices are stored for a subset of primitives in the order that the vertices are connected in, to facilitate the later determination of the topology of the subset of primitives in question.

As well as a set of position indices indicating vertex positions for a subset of primitives, in the present embodiments additional data indicative of the topology of the subset of primitives, which together with the vertex position indices for the subset of primitives can be used to determine the topology of the subset of primitives, is stored. In the present embodiments, this topology information comprises an indication of a number of primitives in the subset of primitives, an indication of the number of edges of the first primitive in the subset of primitives, an indication of the number of edges of the second primitive in the subset of primitives (if present) (in the present embodiment, the second primitive of a subset of primitives (if any) is always configured as being attached to a predefined edge of the first primitive of the subset), an indication of the edge that the third primitive in the subset of primitives (if present) attaches to, and an indication of the two vertices that the fourth primitive in the subset of primitives (if present) attaches to.

The Applicants have recognised in this regard, that by capping the number of primitives that can be present in a subset of primitives to, e.g., four, that constrains the potential topologies that a subset of primitives can take, and thereby facilitates indicating the topology of the primitives in a subset of primitives in a relatively efficient manner and using relatively little data capacity.

Figure 12:
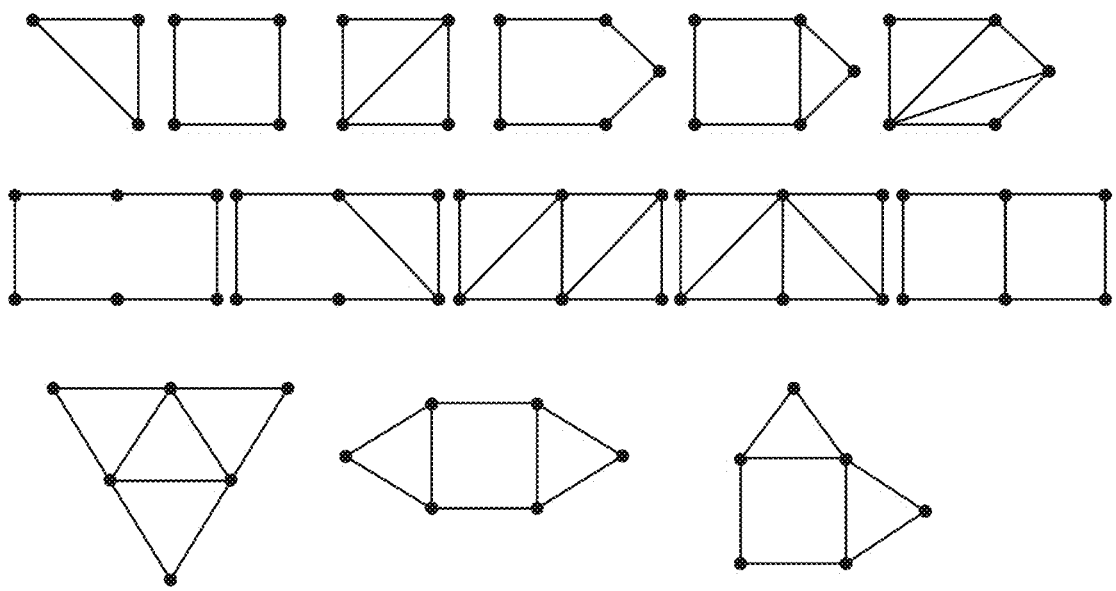
FIG. 12 shows the possible topologies for a subset of primitives in an embodiment of the technology described herein.

FIG. 12 shows the potential topologies that a subset of primitives can have where each subset is able to contain no more than four triangles (as in the present embodiments), and which can accordingly be indicated by the topology information that is used in the present embodiments.

The data that is stored for a subset of primitives that represents the volume of space that the subset of primitives falls within (occupies) defines (indicates), in the present embodiments, an axis aligned bounding volume for the subset of primitives.

This vertex index, topology and bounding volume information is generated and stored for each subset that a set of primitives is divided into.

In the present embodiments, the data for the subsets of primitives is stored as a bounding volume hierarchy, and in particular as a tree structure or structures representing the set of primitives, with each leaf node in the tree corresponding to a given subset of primitives (and having stored for it the data for that subset of primitives). For each higher node in the tree, data representing a combined bounding volume of all its lower nodes is stored.

In the present embodiments, the tree structure that is formed is structured so as to have a very high (and constant) branching factor, and not many levels. In an embodiment tree structures having a 128 leaf nodes and only a few levels, e.g. 2 or 3 levels, above those 128 leaf nodes are used. Where a given set of primitives is divided into more than 128 subsets of primitives, then additional tree structures are used as required. In this case, the "trees" (groups of 128 subsets of primitives) are in an embodiment organised such that the combination of the subsets of primitives of each tree is as small in volume as possible.

Other arrangements would, of course, be possible.

Figure 13:
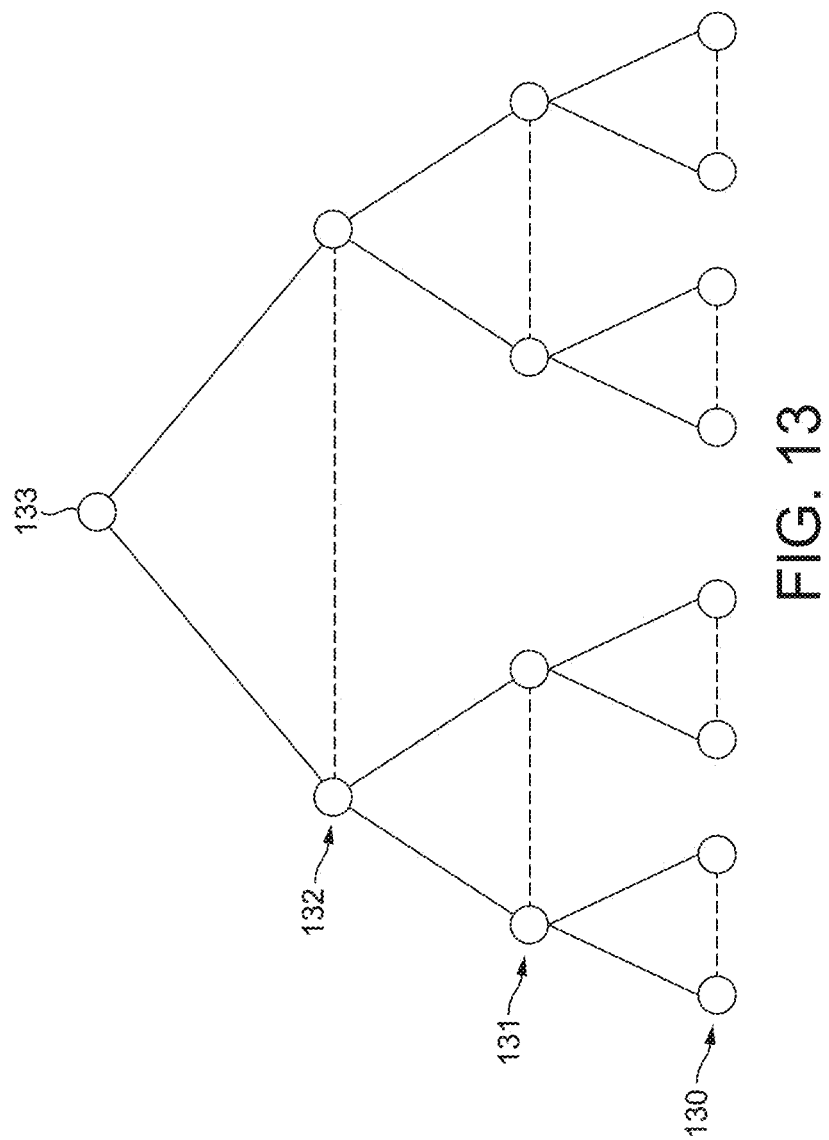
FIG. 13 shows an exemplary tree structure in an embodiment of the technology described herein.

FIG. 13 shows such an exemplary tree structure. Each leaf node 130 corresponds to a subset of primitives and has stored for it the data for that subset of primitives.

The higher level nodes 131, 132 accordingly correspond to the combination of their child nodes, and have stored for them a bounding volume that indicates the volume of space occupied by all of the subsets of primitives of their respective child nodes.

The root node 133 accordingly corresponds to the combination of all of the leaf nodes, and has stored for it a bounding volume that indicates the volume of space occupied by all of the subsets of primitives of the leaf nodes.

Other arrangements of and for the data that is stored for a subset of primitives would, of course, be possible.

Figure 14:
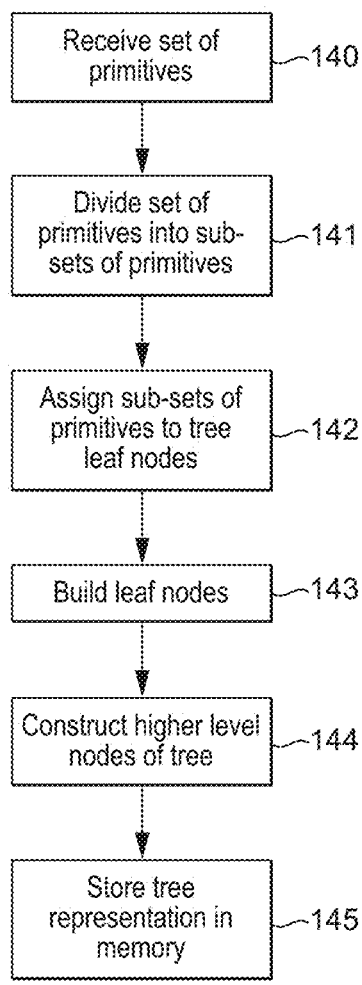
FIG. 14 shows the generation of a tree structure in an embodiment of the technology described herein.

FIG. 14 shows schematically the process for generating a tree representation for a set of primitives that is used in the present embodiments.

As shown in FIG. 14, a set of primitives to be processed, e.g. for a draw call, will be received (step 140) and divided into plural sub-sets of primitives in the manner discussed above (step 141).

Once the set of primitives has been divided into plural sub-sets of primitives, a tree representation of the set of primitives is constructed. The first stage in this process is to generate a leaf node of the tree for each respective sub-set of primitives that the set of primitives has been divided into.

To do this, each primitive sub-set is assigned to a leaf node of the tree (step 142).

The leaf nodes are then "built", by determining and storing for each leaf node of the tree, the data representative of the primitives of the sub-set of primitives that the node represents, and data indicating the volume of space that that sub-set of primitives falls within (step 143).

Once the leaf nodes that each represent a given sub-set that the set of primitives has been divided into have been determined and "constructed", the higher level nodes for the tree representation are determined and constructed (step 144). The higher level nodes are built from their respective child nodes, by "merging" their respective child nodes so that each higher level node in the tree represents the combination of the sub-sets of primitives that each of its child nodes represents.

The data that is stored for each higher level node comprises a bounding volume indicating the volume of space that all of its sub-sets of primitives falls within. This bounding volume for a higher level node may be generated, e.g., by taking the minimum and maximum vertex position values along each axis across all of the higher level node's child nodes.

Once the tree representation for the set of primitives has been generated, it is then stored in memory for use (step 145).

Once prepared, the tree representation is then used, as discussed above, to determine (identify) subsets of primitives that could cast a shadow in a (and each) tile of the frame being rendered.

To use the tree representation to determine the subsets of primitives that could cast a shadow in a tile, the nodes of the tree are traversed, building up a set of subsets of primitives that could cast a shadow. The tree is traversed from the root node, working down towards the leaf nodes (if the traversal is to continue).

During the traversal, the bounding volume for each node of the tree that is to be considered is tested against the light source bounding frustum(s) for the tile that is being rendered, to determine if any part of the bounding volume falls within the light source bounding frustum. This frustum test is performed using a suitable bounding volume-frustum intersection test.

Where necessary, the bounding volume for a node is transformed to the appropriate screen space position before it is tested against the light source bounding frustum. This may, use, e.g., a transformation matrix that provided as part of the vertex shading process.

The result of the light source bounding frustum test for a node is used to determine whether to include the sub-set of primitives for the node in the set of subsets of primitives that could cast a shadow for the tile, and to determine whether and how to continue the traversal of the tree.

The testing process starts with the root node of the tree.

If a node passes the light source bounding frustum test completely (i.e. its bounding volume is completely within the light source bounding frustum), the sub-sets of primitives for all the leaf nodes of the node are then included in (added to) the set of subsets of primitives that could cast a shadow for the tile. The traversal of the tree then continues at the parent of the accepted node (and thus moves to the next child node of that parent node still to be tested (if any)).

Correspondingly, if a node fails the light source bounding frustum test completely (i.e. its bounding volume is completely outside the light source bounding frustum), the sub-sets of primitives for all the leaf nodes of the node are not included in (added to) the set of subsets of primitives that could cast a shadow for the tile. The traversal of the tree again then continues at the parent of the rejected node (and thus moves to the next child node of the parent node of the rejected node still to be tested (if any)).

If a node that is not a leaf node partially passes the light source bounding volume frustum test (e.g. its bounding volume is only partially (but not fully) within the light source bounding frustum), then the sub-sets of primitives for the leaf nodes of the node are not included in the set of subsets of primitives that could cast a shadow for the tile at that stage, but instead the traversal of the tree is continued to the child nodes of the node in question (which are then tested themselves).

Where there is no further child node of a parent node that is still to be tested, the traversal continues at the parent node of the parent node in question (and thus moves to the next child node of the higher level parent node still to be tested (if any)) (continues with the higher level node to be tested next (if any)).

If a leaf node is found to at least partially pass the light source bounding volume frustum test (i.e. its bounding volume is at least partially within the light source bounding frustum), then the sub-set of primitives for the leaf node is included in the set of subsets of primitives that could cast a shadow for the tile. The traversal of the tree then continues at the parent of the accepted leaf node (and thus moves to the next leaf node of that parent node still to be tested (if any)).

This process is repeated until the tree has been completely traversed (until all the nodes in the tree that need to be tested, have been tested).

To generate the set of subsets of primitives, as the tree is traversed a running, master list of subsets of primitives is maintained, and as nodes pass the light source bounding frustum test, the subset(s) of primitives for each new "passing" node are added to the existing "master" list of subsets of primitives.

The output of the tree traversal is a set of subsets of primitives that could cast a shadow in the tile in question (in the form of a list of subsets of primitives indicating the subsets of primitives that could cast a shadow for the tile).

This subsets of primitives information is then provided to the graphics processing unit (GPU) 3 to indicate the subsets of primitives that could cast a shadow in the specular lighting for the tile in question. The GPU 3 then processes (renders) the tile, using the indicated list of "shadow-casting" subsets of primitives to determine and simulate the effect of shadows in the specular lighting in the tile in the manner discussed above with reference to FIG. 4, etc.

Figure 15:
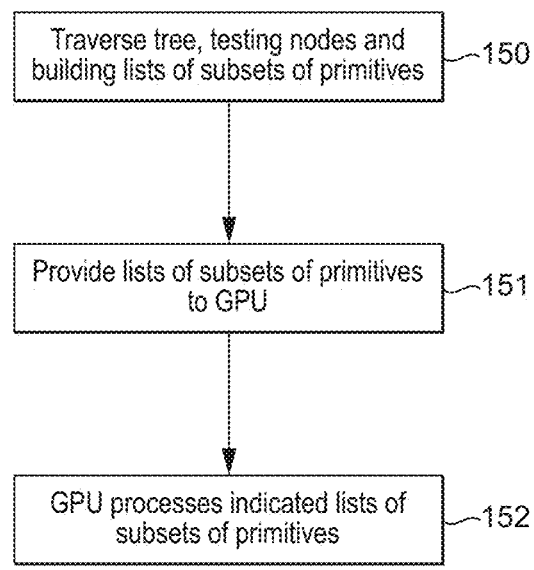
FIG. 15 shows the use of a tree structure in an embodiment of the technology described herein.

FIG. 15 is a flowchart showing the steps of the process of using the tree representation. As shown in FIG. 15, the process starts with traversing the tree, testing the nodes of the tree against the light source bounding frustum 150 and building lists of subsets of primitives using the results of those tests (step 150). The so-determined lists of subsets of primitives are then provided to the graphics processor 3 (step 151), and the graphics processor then processes the indicated lists of subsets of primitives appropriately (step 152).

When using the subsets of primitives that could cast a shadow for a tile to determine and simulate the effect of shadows in the tile, the graphics processor will use the information representative of the primitives of a subset of primitives that is stored for the subsets of primitives in question to determine the position of the primitive of the subset of primitives and thereby perform the occlusion testing against the subset of primitives in the manner discussed above, to determine the effect of a (and of each) subset of primitives that could cast a shadow on the light source visibility for each sampling position of the tile being processed.

This process is repeated for each tile to be processed for the output frame in turn, until all the tiles for the output frame have been rendered by the graphics processor 3. The process can then move on to the next output frame, and so on.

It will be appreciated from the above, that embodiments of the technology described herein involve a number of processes that will be performed to generate the overall, final, "shadowed" output frame. For example, there will be a stage of building the subsets of primitives, building the tile specular volumes, etc. Subsequently, the subsets of primitives are appropriately "culled" to determine a set of subsets of primitives that could cast a shadow for each tile of the output frame being generated. Finally, the determined set of subsets of primitives that could cast a shadow in a tile is then used when processing the tile to determine and simulate the effects of shadows on the specular lighting in the tile. These various processes may be carried out at different points in time and in different places in the overall graphics processing system.

Figure 16:
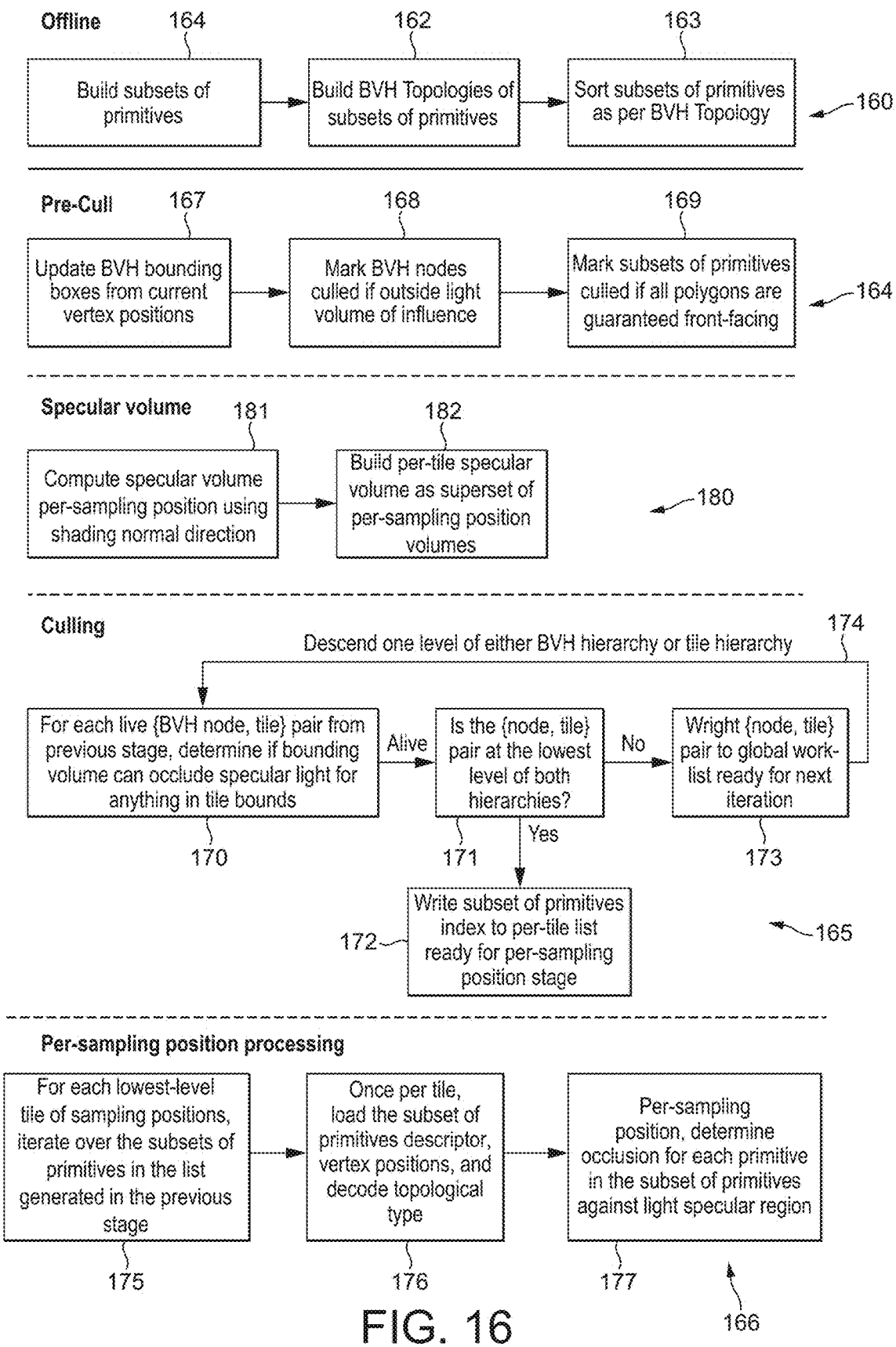
FIG. 16 shows schematically an embodiment of the operation of the graphics processing system of FIG. 1 in accordance with the technology described herein.

FIG. 16 shows schematically the various stages of the overall operation of the present embodiments.

As shown in FIG. 16, the process starts with the construction of the subsets of primitives 160. This process comprises dividing the set of primitives in question into appropriate subsets of primitives (step 161), and then building the bounding volume hierarchy (tree structure) topology of the subsets of primitives (step 162). Finally, the subsets of primitives may be sorted based on the bounding volume hierarchy (tree structure) topology (step 163). This sorting may, as discussed above, comprise, e.g., sorting the subsets of primitives into respective groups of subsets of primitives each of which will be represented by a given tree structure, such that the individual groups of subsets of primitives that are represented by a given tree structure have as small a size as possible (e.g. measured in terms of the sum of the axis extents of their bounding boxes and/or the surface areas of their bounding boxes).

As shown in FIG. 16, this process of building the subsets of primitives and the corresponding bounding volume hierarchy topology can be performed offline, in advance of the generation of the output frame in question, e.g. on a CPU (e.g. of the overall graphics processing system). It could also, e.g., be performed by the driver for the graphics processor that is to perform the graphics processing, if desired.

As shown in FIG. 16, once the subsets of primitives and their bounding volume topology (tree structures) have been constructed, that information can then be used to perform the operations discussed above when generating an output frame. As shown in FIG. 16, these operations can be divided into a pre-culling stage 164, a specular volume generating stage 180, a culling stage 165 and finally the per-sampling point processing stage 166.

These processes can all be, and are in an embodiment, performed at "run time", on the graphics processor.

As shown in FIG. 16, the pre-culling stage 164 may comprise first updating the bounding volume hierarchy (tree structure) bounding boxes for the subsets of primitives using the current vertex positions (step 167).

This may be appropriate to allow for any animation of the geometry (e.g. a character's lips, cheeks, etc. could move as they talk). In this case, it may be assumed that the topology of the vertices which form the primitives in question remains the same, but the actual vertex positions will change. At this stage therefore the bounding volumes could be updated with the new vertex position data (but with the topology for the subsets of primitives remaining the same). In this case, a "reference pose" (e.g. of the character "at rest" in a non-animated state) could be used to build the subsets of primitives initially.

It would also be possible as part of this pre-culling processing 164 to allow for any animation of the geometry in this step of updating the bounding volume hierarchy bounding boxes from the current vertex positions, if desired.

It is then determined, as discussed above, whether any of the subsets of primitives fall completely outside the light volume of influence (and any such subsets are then culled at this stage) (step 168).

As shown in FIG. 16, there may also be a step of culling subsets of primitives if it can be determined that all the primitives in the subset of primitives are guaranteed to be front-facing (step 169). This may be used to cull subsets of primitives where the shadow determination process assumes that primitives (and thus subsets of primitives) that entirely face the light will not cast shadows (i.e. that only primitives that are facing a sampling position (and thus whose backface is "seeing the light") can cast shadows.

The facing direction of the subsets of primitives can be determined, e.g., by checking the normals for the subsets of primitives.

The result of the pre-culling stage 164 will be a reduced, overall set of subsets of primitives that can then be tested against each tile of the output frame to determine a set of subsets of primitives that could cast a shadow for each tile of the output frame.

The specular volume building stage 180 determines the specular volume for each tile of the frame being rendered. To do this, as shown in FIG. 16, the specular volume for each sampling position of given tile is determined using the defined normal direction for the sampling position (step 181). Each tile's specular volume is then constructed as being the super set of the sampling position specular volumes for the sampling positions of the tile in question (step 182).

Once the subsets of primitives, and the specular volumes for the tiles, have been determined, they can then be used to determine a set of subsets of primitives that could cast a shadow in the specular lighting for each tile of the output frame.

This process is shown as the culling stage 165 in FIG. 16.

As shown in FIG. 16, this culling stage 165 comprises testing each bounding volume hierarchy (tree structure)

node and tile pair to determine if the bounding volume for the node can occlude the specular light for anything in the tile bounds (step 170).

If it is determined that the bounding volume could occlude the specular light for anything in the tile bounds, it is then determined if the subset bounding volume hierarchy node and the tile pair are at the lowest level of both hierarchies (step 171). If so, the primitive subset in question (i.e. represented by the bounding volume hierarchy node in question) is added to the per-tile list of subsets of primitives ready for the per-sampling position stage (step 172).

On the other hand, if the lowest level of both hierarchies has not yet been reached, the node and tile pair is added to a global work list ready for the next iteration (step 173), and the process then descends 174 one level of either the bounding volume hierarchy (tree structure node hierarchy) or the output frame tile hierarchy, to perform the test at the next lower level of the hierarchy.

This is continued until all of the subsets of primitives have been appropriately tested against the tile in question (and is then repeated for each tile of the output frame to be processed).

The output of the culling stage 165 will be respective lists of subsets of primitives that could cast a shadow in the specular lighting for each tile of the output frame.

The tiles are then processed in the per-sampling point processing stage 166 to determine the occlusion (the specular visibility parameter) for each sampling position in the tile.

As discussed above, and as shown in FIG. 16, this comprises, inter alia, for each lowest level tile of sampling positions iterating over the subsets of primitives in the list generated in the culling stage (step 175), and once per tile, loading the appropriate subset of primitives descriptor and vertex positions for each subset of primitives to be considered for the tile and decoding the vertex positions and topological type for the subset of primitives (step 176), and then using that information to determine the per-sample position occlusion for each primitive in the subset of primitives (step 177).

This is repeated for each subset of primitives listed as potentially casting a shadow in the specular lighting in tile in question (and is correspondingly repeated for each tile of the output frame to be generated).

Various modifications, additions, and alternatives to the above-described embodiments of the technology described herein would be possible, if desired.

For example, although the present embodiment has been described above with reference to testing "light source bounding frustums" to determine subsets of primitives that could cast a shadow in a given frame region (tile), it would alternatively be possible to test for this by trying to find a "splitting plane", where the light and the region to be lit are on one side of the plane and the potentially occluding geometry (subset of primitives) is on the other.

The above embodiments consider the specular lighting contribution for respective processing tiles of a frame that is being rendered. It would be possible to organise the sampling positions for a frame being rendered into regions for processing in the manner of the present embodiments based on other or additional criteria, such as one or more criteria that may affect the specular lighting at the sampling positions. For example, the sampling positions could be sorted into regions (groups) for the purpose of a specular lighting contribution determination based on their positions, normal directions, specular bounds, material properties etc, if desired.

It would also be possible, e.g., to initially determine the unoccluded specular lighting contribution for each sampling position, and to then discard from further processing in respect of the specular lighting determination any sampling positions found to have a zero unoccluded specular lighting contribution.

Figure 20:
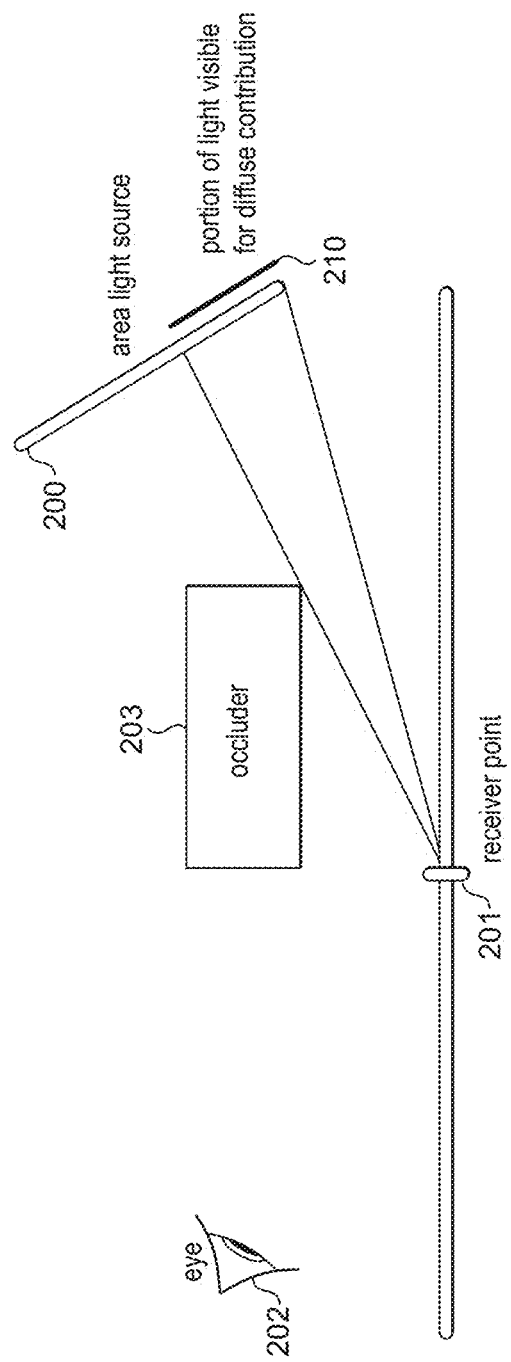
FIG. 20 illustrates the determination of a diffuse lighting contribution in an embodiment of the technology described herein.

The above embodiments describe determining the effect of shadows on specular lighting in a frame (image) being rendered. However, a frame being rendered will typically also include diffuse lighting effects, even at sampling positions that are not specularly lit. FIG. 20 illustrates this and shows that in the example lighting arrangement shown, the sampling position 201, even though it is not subjected to any specular lighting from the light source 200, will still be affected by diffuse lighting from the portion 210 of the light source 200 that is not occluded by the geometry 203.

Thus, in an embodiment, the determination of the specular lighting contribution in the manner of the present embodiments is used in combination (in conjunction) with a corresponding determination for the diffuse lighting contribution in the frame regions of the frame being rendered. In an embodiment, the diffuse lighting contribution (and the effect of shadows on the diffuse lighting contribution) is determined in the manner described in the Applicant's earlier GB Patent Application GB-A-2525636.

Thus, the diffuse lighting contribution (and the effect of shadows on the diffuse lighting contribution) is in an embodiment determined in a similar manner to the specular lighting contribution as described above, but for the diffuse lighting contribution, when determining the set of geometry for a frame region that could cast a shadow from a light source for the purposes of the diffuse lighting contribution the entire area of a light source is considered (i.e. there is no determination of any (potentially) smaller area of the light source for the purposes of the diffuse lighting determination).

Correspondingly, when determining a diffuse light source visibility parameter for a sampling position by testing whether, for each of one or more sampling positions representing the position of the light source, a ray cast between the frame region sampling position in question and the light source sampling position would intersect geometry in the determined set of geometry that could cast a shadow at the frame region sampling position in question, a set of sampling positions representing (covering) the entire area of the light source (as the entire light source can (potentially) contribute to the diffuse lighting in a frame region) is used.

In an embodiment, a lower density (resolution) of sampling positions is used for representing the light source for the diffuse light source visibility parameter determination as compared to the density (resolution) of the light source representing sampling positions that are used for determining the specular light source visibility parameters for the sampling positions of a frame region.

The determined diffuse light source visibility parameters for the frame region sampling positions are in an embodiment then used to simulate the (determined) effect of the shadows on the diffuse lighting in the rendered output frame region (in an embodiment to modulate the diffuse lighting from the light source at the sampling positions when determining the output, rendered, colour to be used for the frame region (screen space) sampling positions).

Where a determination of specular light source visibility parameters and diffuse light source visibility parameters is being performed, then there will, accordingly, be, in effect, a specular lighting contribution determination (processing path) and a diffuse lighting contribution determination (processing path) for the sampling positions of the frame (for the and each region of the frame). Depending upon how they are lit, given sampling positions may have only a diffuse lighting contribution (and diffuse light source visibility parameter), or they may have both a diffuse lighting contribution and a specular lighting contribution (a diffuse light source visibility parameter and a specular light source visibility parameter), or they may have neither a diffuse lighting contribution nor a specular lighting contribution (e.g. where they are completely in shadow).

The determined light contribution or contributions for a sampling point should be and are in an embodiment appropriately used when determining the output, rendered colour to be used for a sampling position. Thus where a sampling position has both a diffuse lighting contribution from a light source and a specular lighting contribution from a light source, those lighting contributions are in an embodiment combined appropriately (e.g. summed or averaged) to provide the overall lighting contribution when determining the output, rendered colour to be used for the sampling position.

Where a determination of both specular light source visibility parameters and diffuse light source visibility parameters, etc., is being performed, then in an embodiment, the two processes (the specular lighting process and the diffuse lighting process) share some of their processing operations, data structures, and/or processing results.

For example, the "offline" and "pre-cull" stages shown in FIG. 16 can be shared between the specular lighting and diffuse lighting determinations.

Equally, any determination of frame regions that will not be lit at all by a light source can be used in common for both the specular and diffuse lighting determinations. Similarly, any frame region that is determined to be completely in shadow for the purposes of the diffuse lighting determination can be equally assumed to be completely in shadow for the specular lighting determination.

Correspondingly, any determination of data, such as sets of geometry (e.g. subsets of primitives), can be, and is in an embodiment, shared (reused) appropriately between the diffuse and specular lighting determinations.

Where the diffuse lighting determination is done first, any appropriate specular lighting determination processing that can be performed as part of that diffuse lighting determination pass can be performed during the diffuse lighting determination processing.

In an embodiment, the specular lighting determination is performed in "real time" (as the frame is being rendered), because the specular lighting in the frame will be view position (camera position) dependent. However, the diffuse lighting determination may be performed independently of any view determination, as that generally will not be view position dependent.

The light source visibility parameter determination could be adapted to take account of transparent primitives. For example, when a rasterisation process to compute visibility for the sample points is performed, the resulting set of bits could be modulated by a random set of bits whose ratio of set bits is proportional to the transparency (or opacity) of the primitive (geometry) in question. Alternatively, if the sample points themselves are suitably randomised, they could be modulated by a simple fixed bit-string with an appropriate ratio of set bits. It would also be possible to extend this to provide fully coloured RGB transparency, by having one bit each for each colour channel R, G, B (for each visibility sample).

The above embodiments consider the geometry in world-space (perform the bounding volume tests in world space). Depending upon the graphics processing hardware that is available and the results that are required, it would also be possible to (and may be preferable to) perform the computations in screen space, if desired.

Also, although the above embodiment has been described in the context of a tiled deferred renderer, this is not essential, and the present embodiments (and the technology described herein) can be used with and for other forms of renderer. Thus, for example, the present embodiments and the technology described herein could be used with other tiled methods, such as "tiled forward rendering" (also known as "forward plus"), and also with non-tiled renderers. With a non-tiled renderer, a tiled approach could be used to render the light source visibility parameters into respective screen space visibility buffers, with the final rendering (shading) then being performed in a separate pass.

As will be appreciated from the above, the technology described herein, in embodiments, can provide a process and techniques for determining the effect of shadows on specular lighting in frames being rendered in a more efficient and effective manner.

This is achieved, in embodiments, by using determined specular volumes for sampling positions or sets of sampling positions being rendered to identify smaller regions of light sources and sets of potentially occluding geometry that are relevant to the specular lighting at the sampling positions, determining specular light source visibility parameters for the sampling positions using the determined light source specular regions and sets of geometry, and then modulating the specular effect of the light source(s) using the determined specular light source visibility parameters when performing the shading process for the sampling positions.

In particular, by identifying regions of light sources and sets of potentially occluding geometry that will be relevant to the specular lighting at sampling positions, that enables smaller areas of a frame and/or of a light source, etc., to be considered for the purposes of the specular lighting determination, thereby, e.g., allowing that determination to be performed at a higher frequency (at a higher resolution) (which is desirable for the purposes of specular lighting) without significantly increasing the overall processing burden.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system when rendering a frame for output that includes a light source that could cast shadows, the method comprising:
   for at least one region of the frame being rendered:
   determining a specular volume for the region of the frame being rendered;
   using the determined specular volume to determine a region of the light source to be considered for the frame that could provide a specular lighting contribution in the region of the frame being rendered;

determining a set of the geometry to be processed for the frame that could cast a shadow from the light source being considered for the region of the frame being rendered; and for each sampling position of a set of sampling positions for the region of the frame being rendered, determining a specular light source visibility parameter using the determined set of geometry and the determined region of the light source that could provide a specular lighting contribution in the region of the frame being rendered;

the method further comprising:

also determining for each sampling position of the set of sampling positions for the region of the frame being rendered, a diffuse light source visibility parameter representing the effect of any shadows on the diffuse lighting from the light source at the sampling position;

wherein the step of determining a diffuse light source visibility parameter for a frame region sampling position comprises:

determining, for each sampling position of a set of plural sampling positions representing the entire area of the light source, whether the light source sampling position will be visible from the frame region sampling position using a determined set of geometry that could cast a shadow for the frame region; and wherein a lower density of sampling positions is used for representing the light source for the diffuse light source visibility parameter determination as compared to the density of the light source representing sampling positions that are used for determining the specular light source visibility parameters for the sampling positions of the frame region.

2. The method of claim 1, comprising:
sorting the sampling positions for a frame into groups to thereby provide frame regions for processing based on their positions in the frame, and one or more other parameters that could affect the specular lighting at the sampling positions.

3. The method of claim 1, wherein the graphics processing system is a tile-based system, and the region of the frame being rendered is a tile.

4. The method of claim 1, wherein the frame being rendered is divided into plural regions, and the method comprises:

for each region of the frame:
determining a specular volume for the region of the frame; and
using the determined specular volume to determine whether the region of the frame could be lit by the light source so as to cause specular lighting in the frame region; and the method further comprises:
for frame region that it is determined could be subjected to specular lighting from the light source:
using the determined specular volume for the frame region to determine a region of the light source to be considered for the frame that could provide a specular lighting contribution in the frame region;
determining a set of the geometry to be processed for the frame that could cast a shadow from the light source being considered for the frame region; and
for each sampling position of a set of sampling positions for the frame region, determining a specular light source visibility parameter using the determined set of geometry and the determined region of the light source that could provide a specular lighting contribution in the frame region.

5. The method of claim 1, comprising:
determining the specular volume for the region of the frame being rendered by determining a respective specular volume for each of plural sampling positions in the region of the frame being considered, and then determining the specular volume for the frame region as a combination of the specular volumes for the individual sampling positions.

6. The method of claim 1, comprising:
determining a region of the light source that could provide a specular lighting contribution in the region of the frame being rendered by intersecting the determined specular volume for the frame region with the area of the light source being considered.

7. The method of claim 1, comprising:
using the determined region of the light source that could provide a specular lighting contribution in the frame region to determine the set of geometry for the frame region that could cast a shadow from the light source.

8. The method of claim 1, wherein the step of determining a specular light source visibility parameter for a frame region sampling position comprises:
determining, for each sampling position of a set of plural sampling positions representing the determined region of the light source that could provide a specular lighting contribution in the frame region, whether the light source sampling position will be visible from the frame region sampling position using the determined set of geometry that could cast a shadow for the frame region.

9. The method of claim 1, further comprising:
using the determined specular light source visibility parameters for the sampling positions for the region of the frame being rendered to modulate the specular effect of the light source at each sampling position when rendering an output version of the frame region.

10. The method of claim 1, comprising:
determining a diffuse light source visibility parameter for each sampling position of the set of sampling positions for the region of the frame being rendered using a determined set of the geometry to be processed for the frame that could cast a shadow in the diffuse lighting from the light source being considered for the region of the frame being rendered;

and wherein:
the set of geometry for the frame region that could cast a shadow in the diffuse lighting from the light source is determined using the entire extent of the light source.

11. A graphics processing system comprising:
a rasteriser that rasterises input primitives to generate graphics fragments to be processed, each graphics fragment having one or more sampling points associated with it; and
a renderer that processes fragments generated by the rasteriser to generate output fragment data;
and wherein the graphics processing system includes processing circuitry configured to, when rendering a frame for output that includes a light source that could cast shadows:
for at least one region of the frame being rendered:
determine a specular volume for the region of the frame being rendered;
use the determined specular volume to determine a region of the light source to be considered for the frame that could provide a specular lighting contribution in the region of the frame being rendered;

determine a set of the geometry to be processed for the frame that could cast a shadow from the light source being considered for the region of the frame being rendered; and for each sampling position of a set of sampling positions for the region of the frame being rendered, determine a specular light source visibility parameter using the determined set of geometry and the determined region of the light source that could provide a specular lighting contribution in the region of the frame being rendered;

wherein the processing circuitry is further configured to:

also determine for each sampling position of the set of sampling positions for the region of the frame being rendered, a diffuse light source visibility parameter representing the effect of any shadows on the diffuse lighting from the light source at the sampling position;

wherein the determining a diffuse light source visibility parameter for a frame region sampling position comprises:

determining, for each sampling position of a set of plural sampling positions representing the entire area of the light source, whether the light source sampling position will be visible from the frame region sampling position using a determined set of geometry that could cast a shadow for the frame region; and wherein a lower density of sampling positions is used for representing the light source for the diffuse light source visibility parameter determination as compared to the density of the light source representing sampling positions that are used for determining the specular light source visibility parameters for the sampling positions of the frame region.

12. The system of claim 11, wherein the graphics processing system includes processing circuitry configured to:

sort the sampling positions for a frame into groups to thereby provide frame regions for processing based on their positions in the frame, and one or more other parameters that could affect the specular lighting at the sampling positions.

13. The system of claim 11, wherein the graphics processing system is a tile-based system, and the region of the frame being rendered is a tile.

14. The system of claim 11, wherein the frame being rendered is divided into plural regions, and the graphics processing system includes processing circuitry configured to:

for each region of the frame:
determine a specular volume for the region of the frame; and
use the determined specular volume to determine whether the region of the frame could be lit by the light source so as to cause specular lighting in the frame region; and wherein the graphics processing system includes processing circuitry configured to:

for frame region that it is determined could be subjected to specular lighting from the light source:
use the determined specular volume for the frame region to determine a region of the light source to be considered for the frame that could provide a specular lighting contribution in the frame region;
determine a set of the geometry to be processed for the frame that could cast a shadow from the light source being considered for the frame region; and
for each sampling position of a set of sampling positions for the frame region, determine a specular light source visibility parameter using the determined set of geometry and the determined region of the light source that could provide a specular lighting contribution in the frame region.

15. The system of claim 11, wherein the graphics processing system includes processing circuitry configured to:

determine a specular volume for a region of a frame being rendered by determining a respective specular volume for each of plural sampling positions in the region of the frame, and then determining the specular volume for the frame region as a combination of the specular volumes for the individual sampling positions.

16. The system of claim 11, wherein the graphics processing system includes processing circuitry configured to:

determine a region of the light source that could provide a specular lighting contribution in the region of the frame being rendered by intersecting the determined specular volume for the frame region with the area of the light source being considered.

17. A non-transitory computer readable storage medium storing computer software code which when executing on a processor performs a method of operating a graphics processing system when rendering a frame for output that includes a light source that could cast shadows, the method comprising:

for at least one region of the frame being rendered:
determining a specular volume for the region of the frame being rendered;
using the determined specular volume to determine a region of the light source to be considered for the frame that could provide a specular lighting contribution in the region of the frame being rendered;
determining a set of the geometry to be processed for the frame that could cast a shadow from the light source being considered for the region of the frame being rendered; and
for each sampling position of a set of sampling positions for the region of the frame being rendered, determining a specular light source visibility parameter using the determined set of geometry and the determined region of the light source that could provide a specular lighting contribution in the region of the frame being rendered;

the method further comprising:

also determining for each sampling position of the set of sampling positions for the region of the frame being rendered, a diffuse light source visibility parameter representing the effect of any shadows on the diffuse lighting from the light source at the sampling position;

wherein the step of determining a diffuse light source visibility parameter for a frame region sampling position comprises:

determining, for each sampling position of a set of plural sampling positions representing the entire area of the light source, whether the light source sampling position will be visible from the frame region sampling position using a determined set of geometry that could cast a shadow for the frame region; and wherein a lower density of sampling positions is used for representing the light source for the diffuse light source visibility parameter determination as compared to the density of the light source representing sampling positions that are used for determining the specular light source visibility parameters for the sampling positions of the frame region.

* * * * *